US006259450B1

(12) United States Patent
Chiabrera et al.

(10) Patent No.: US 6,259,450 B1
(45) Date of Patent: Jul. 10, 2001

(54) THREE-DIMENSIONAL DISPLAY SYSTEM APPARATUS AND METHOD

(75) Inventors: Alessandro Chiabrera; Bruno Bianco, both of Genoa (IT); Jonathan J. Kaufman, Brooklyn, NY (US)

(73) Assignee: Hyper3D Corp., Brooklyn, NY (US)

( * ) Notice: Subject to any disclaimer, the term of this patent is extended or adjusted under 35 U.S.C. 154(b) by 483 days.

(21) Appl. No.: 08/655,257

(22) Filed: Jun. 5, 1996

(51) Int. Cl.[7] .................................................. G06T 15/00
(52) U.S. Cl. ............................................................. 345/419
(58) Field of Search .................................. 345/4, 5, 6, 7,
345/8, 9, 32, 30, 112, 139, 419, 420, 421,
422, 423, 424, 425, 426, 427; 358/88; 354/115;
348/42; 430/523; 395/94; 359/24, 28

(56) References Cited

U.S. PATENT DOCUMENTS

| | | | |
|---|---|---|---|
| 3,894,787 | * 7/1975 | Leith et al. | 359/24 |
| 3,953,869 | * 4/1976 | Wah Lo et al | 354/115 |
| 4,134,104 | * 1/1979 | Karras | 345/6 |
| 4,525,858 | * 7/1985 | Cline et al. | 345/139 |
| 4,571,616 | * 2/1986 | Haisma et al. | 358/88 |
| 4,841,292 | * 6/1989 | Zeno | 345/139 |
| 4,873,651 | * 10/1989 | Raviv et al. | 395/94 |
| 5,028,138 | 7/1991 | Wolff | 356/369 |
| 5,061,049 | 10/1991 | Hornbeck | 359/224 |
| 5,072,215 | * 12/1991 | Brotz | 345/139 |
| 5,214,419 | * 5/1993 | DeMond et al. | 345/32 |
| 5,255,362 | 10/1993 | Brandstetter et al. | 395/163 |
| 5,392,151 | 2/1995 | Nelson | 359/223 |
| 5,408,264 | 4/1995 | Kurata et al. | 348/51 |
| 5,408,344 | 4/1995 | Takiguchi et al. | 359/40 |
| 5,430,560 | 7/1995 | Wakai et al. | 359/17 |
| 5,446,479 | 8/1995 | Thompson et al. | 345/139 |

(List continued on next page.)

OTHER PUBLICATIONS

"A MEMS–Based Projection Display" Peter F. VanKessel, Larry J. Hornbeck, Robert E. Meier, and Michael R. Douglass; Proceedings of the IEEE, vol. 86, No. 8, Aug. 1998, pp. 1687–1704.

"Optimal Free Parameters in Orthonormal Approximations" Albertus C. den Brinker and Harm J.W. Belt, IEEE Transactions on Signal Processing, vol. 46, No. 8, Aug. 1998, pp. 2081–2087.

"Present Status of Three–Dimensional Television Research" by Toshio Motoki, Haruo Isono, and Ichiro Yuyama, Proceedings of the IEEE, pp. 1009–1020.

*Primary Examiner*—Steven Saras
(74) *Attorney, Agent, or Firm*—Dymeka Gossett PLLC

(57) ABSTRACT

In a presently preferred embodiment of the invention, a three-dimensional scene is reproduced on a specialized light display which offers full multiviewpoint capability and autostereoscopic views. The displayed image is produced using a set of M two-dimensional images of the scene collected at a set of distinct spatial locations. These M two-dimensional images are processed through a specialized encoding scheme to obtain a set of N×K display-excitation electrical-input signals, where K is the number of pixels in the display, and N≦M is the number of individual light-radiating elements within one pixel. The display is thus comprised of a total of N×K light-radiating elements. Each of the elements is adapted for control of their associated radiance patterns. The display is connected for response to the set of N×K display-excitation electrical-input signals. In this manner, the display provides a multiviewpoint and autostereoscopic three-dimensional image associated with the original three-dimensional scene. An alternative embodiment of the invention reproduces a temporal sequence of three-dimensional scenes, utilizing a temporal sequence of sets of M two-dimensional images, thus enabling application to three-dimensional television.

32 Claims, 14 Drawing Sheets

U.S. PATENT DOCUMENTS

| | | | |
|---|---|---|---|
| 5,452,024 | 9/1995 | Sampsell | 348/755 |
| 5,457,574 | 10/1995 | Eichenlaub | 359/619 |
| 5,465,175 | 11/1995 | Woodgate et al. | 359/463 |
| 5,475,419 | 12/1995 | Carbery | 348/59 |
| 5,483,254 | 1/1996 | Powell | 345/87 |
| 5,493,427 | 2/1996 | Nomura et al. | 359/40 |
| 5,497,189 | 3/1996 | Aritake et al. | 348/51 |
| 5,537,144 | 7/1996 | Faris | 348/58 |
| 5,589,980 * | 12/1996 | Bass et al. | 345/9 |
| 5,592,215 * | 1/1997 | Kuga | 345/6 |
| 5,614,941 * | 3/1997 | Hines | 348/42 |
| 5,658,719 * | 8/1997 | Sawyer | 430/523 |
| 5,771,121 | 6/1998 | Hentschke | 359/463 |
| 5,790,086 | 8/1998 | Zelitt | 345/32 |

The Flowering of Flat Displays' by Ken Werner, IEEE Spectrum, May 1997, pp. 40–49.

* cited by examiner

THREE-DIMENSIONAL DISPLAY SYSTEM APPARATUS AND METHOD

BACKGROUND OF THE INVENTION

The invention pertains to apparatus and method for three-dimensional display of three-dimensional objects and scenes.

In recent years, various attempts have been made to create three-dimensional displays for various applications, particularly three-dimensional television. Because of the inherent mathematical and practical complexities in the three-dimensional imaging problem, as well as the ad hoc nature of previous approaches, the degree of success thus far has been rather limited.

Most developments in three-dimensional displays have been primarily in stereoscopic techniques, and incorporating a set of discrete multiviews of the three dimensional scenes. These have included both binocular parallax and autostereoscopic three-dimensional systems. Stereoscopic techniques typically require the observer to use a viewing device. In contrast autostereoscopic techniques, which include for example, holographic, lenticular screens and parallax barriers, produce three-dimensional appearance without the use of any special viewing device. The article by Motoki, Isono and Yuyama, in the *Proceedings of the IEEE*, Vol 83, No. 7, July, 1995, pp. 1009–1021, provides a convenient summary of the present state of the art of three-dimensional television, one of the major applications of three-dimensional display systems. As of yet, there is not a practical system which may be considered to offer all of the capabilities necessary to achieve widespread success.

Nomura et al., in U.S. Pat. No. 5,493,427 disclosed apparatus for three-dimensional display using a liquid crystal panel. The inventors' technique relies on simultaneously displaying a plurality of distinct parallax images using a lens with a variable optical characteristic attached to the liquid crystal panel. An alternative embodiment incorporates a head detecting section for detecting a spatial position of an observer's head, and a control section connected to the head detecting section for controlling an operation of the optical characteristic variable lens based on position information of the observer's head.

An autostereoscopic display device is disclosed by Woodgate et al. in U.S. Pat. No. 5,465,175. The device utilizes two lenticular screens and a plurality of light sources which produce divergent light beams for displaying two interlaced views, thereby producing an autostereoscopic image. Another autostereoscopic display is described by Eichenlaub in U.S. Pat. No. 5,457,574. The inventor discloses a display having an optical system and one or more light sources which provide high brightness of the observed three-dimensional images and a high brightness-to-input power ratio. This is achieved by having the light pass directly through the optical system directed to the observer's eyes, instead of being diffused across the field of view.

Kurata et al. in U.S. Pat. No. 5,408,264, disclose a three-dimensional image display apparatus for optically synthesizing images formed on different surfaces on a display screen. In their invention, a plurality of display devices is used with a first and second optical means to synthesize a plurality of images formed at different positions. In a preferred embodiment, the first optical means has polarizing characteristics. In U.S. Pat. No. 5,49,7,189, Aritake et al., disclose a stereoscopic display apparatus which is capable of displaying sequentially a plurality of 2-dimensional images of different visual directions.

Powell in U.S. Pat. No. 5,483,254 discloses a device for forming and displaying stereoscopic images. The display is comprised of a non-planar upper substrate having a series of alternating raised and depressed regions and a non-planar lower substrate having a shape corresponding to the upper substrate, with an electrically controllable light transmissive material contained within the two substrates. The 3D video display device operates thereby to form and displace stereoscopic images at predetermined viewing angles.

A system for displaying three dimensional video is disclosed by Carbery in U.S. Pat. No. 5,475,419. This invention uses a dual-lensed video camera to generate signals representing a subject from each of two different perspectives. The signals are spliced to form a combined video signal consisting of an alternating series of fields representing the image from two perspectives. The video signal is then sent to a receiver including a video screen equipped with a refracticular surface, thereby producing a stereoscopic image towards the eyes of a viewer.

Thompson et al., in U.S. Pat. No. 5,446,479 disclose a multidimensional array video processor system. The system consists of a processor and a video memory. The processor converts a stream of digital information to extract planes of a three dimensional image to store into the video memory to display a three dimensional image. A spatial light modulator is connected to the video memory to receive and display a plane of said image to display a three dimensional image. The most advanced system for display of three-dimensional scenes is based on holography, but a practical realization is many years in the future. A review of this approach may be found in the article by Benton, in the Proc. TAO 1st Int. Symp. on 3D Image Communication Tech., 1993, pp. S-3-1-1-S-3-1-6. Wakai et al. in U.S. Pat. No. 5,430,560 disclose a holographic image display device. The device incorporates a coherent light source and a hologram having a plurality of divided areas, which are sequentially irradiated by the light source to thereby produce the three-dimensional image signal.

The prior art, exemplified by the references that have been briefly discussed, has focussed primarily either on stereoscopic techniques with the use of polarizing or shutter glasses, or relatively primitive autostereoscopic display systems. A major shortcoming of the prior art is its reliance on stereoscopic imaging techniques, in which a set of distinct perspective or parallax views are projected to the viewer in essentially an ad hoc fashion, with no direct correspondence to the radiance of the original three-dimensional scene. This has led to the production of relatively poor three-dimensional display systems. A true multiviewpoint autostereoscopic system which can offer practical, cost effective, as well as realistic and aesthetically acceptable images from a continuum of viewpoints has not yet been developed.

BRIEF STATEMENT OF THE INVENTION

It is accordingly an object of the invention to provide an improved method and apparatus for three-dimensional display of three-dimensional objects and scenes.

Another object is to meet the above object, such that the three-dimensional image may be readily and more reliably produced than heretofore.

A related object is to provide a three-dimensional imaging system in which both multiviewpoint—from a continuum of viewpoints—and autostereoscopic capabilities can be optimally obtained, without requiring coherent illumination.

Another related object is to provide an optimal mathematical framework for synthesizing three-dimensional images on a three-dimensional display.

A specific object is to achieve the above objects with small time delay if desired, using real-time signal processing means, to enable for a given three-dimensional scene its display in approximately real-time.

It is a general object to achieve the foregoing objects with apparatus components many of which are commercially available.

Briefly stated, the invention in its presently preferred form achieves the foregoing objectives by recording a three-dimensional scene with M television cameras, each placed in a distinct position with respect to the scene being recorded, and each producing a separate channel (i.e., view) of recorded data. The M channels are processed at each point in time (i.e., at each image frame) to optimally evaluate an associated set of N tesseral coefficient functions in a finite tesseral harmonic expansion of the scene radiance. These tesseral coefficient functions are functions of the spatial coordinates, x and y, in the three-dimensional scene coordinate system (object space), which is assumed one-to-one with the display coordinate system. The functions are used in conjunction with specialized display hardware, constructed from a currently available model of a reflective light device, namely an appropriately adapted digital micromirror device. In the usual digital micromirror device the beam of light reflected from each micromirror is either radiating "on" directly towards the viewer in the direction orthogonal to the surface of the device or radiating "off" out of view of the observer to a light sink. In contrast, the new design is such that each micromirror's "on" position corresponds to the beam of light being reflected in a specified angular but not necessarily orthogonal direction. The display design is specified further such that each pixel of the K pixels in the display is comprised of a set of N (N≦M) micromirrors, each of these N micromirrors radiating (i.e., reflecting) a beam in a distinct direction when "on." Each individual micromirror is "off" when it's associated light beam is directed to a light sink, and the position of each micromirror is controlled by an electrical-input signal as with the standard digital micromirror device. Further, each sets of N micromirrors associated with all the display pixels have identical distributions in terms of their relative directional orientations. The overall display is controlled by a set of N×K signals, known as the display-excitation electrical-input signals; the specification of particular values for the N display-excitation electrical-input signals at each pixel produces a specific radiance pattern associated with the display as a whole. In the presently preferred embodiment of the invention, N=4 micromirrors, K=512×480=245,760 pixels and M=4 cameras (i.e., 4 two-dimensional views), and the four micromirrors associated with any display pixel are directed at ±10° vertically and ±10° horizontally, respectively. It should therefore be understood that in the currently preferred embodiment a total of 512×480×4=983,040 micromirrors are used for display of the three-dimensional monochrome image.

A finite tesseral harmonic expansion of the radiance of the reflected light device is then used in conjunction with the finite tesseral harmonic expansion of the M images to derive an optimal set of display-excitation electrical-input signals. The planar reflective light display, when driven by this set of display-excitation electrical-input signals, produces a displayed image similar to that which one would observe by looking at the original three-dimensional scene directly. In particular, a continuous interpolation for any viewpoint in between the discrete viewpoints corresponding to M cameras is achieved. The above procedure is repeated for each image frame in the television images, to obtain an optimal implementation of multiviewpoint autostereoscopic three-dimensional television, whereby achieving the indicated objectives.

BRIEF DESCRIPTION OF THE DRAWINGS

The invention will be described in detail for a presently preferred embodiment, in conjunction with the accompanying drawings, in which.

Figure 1:
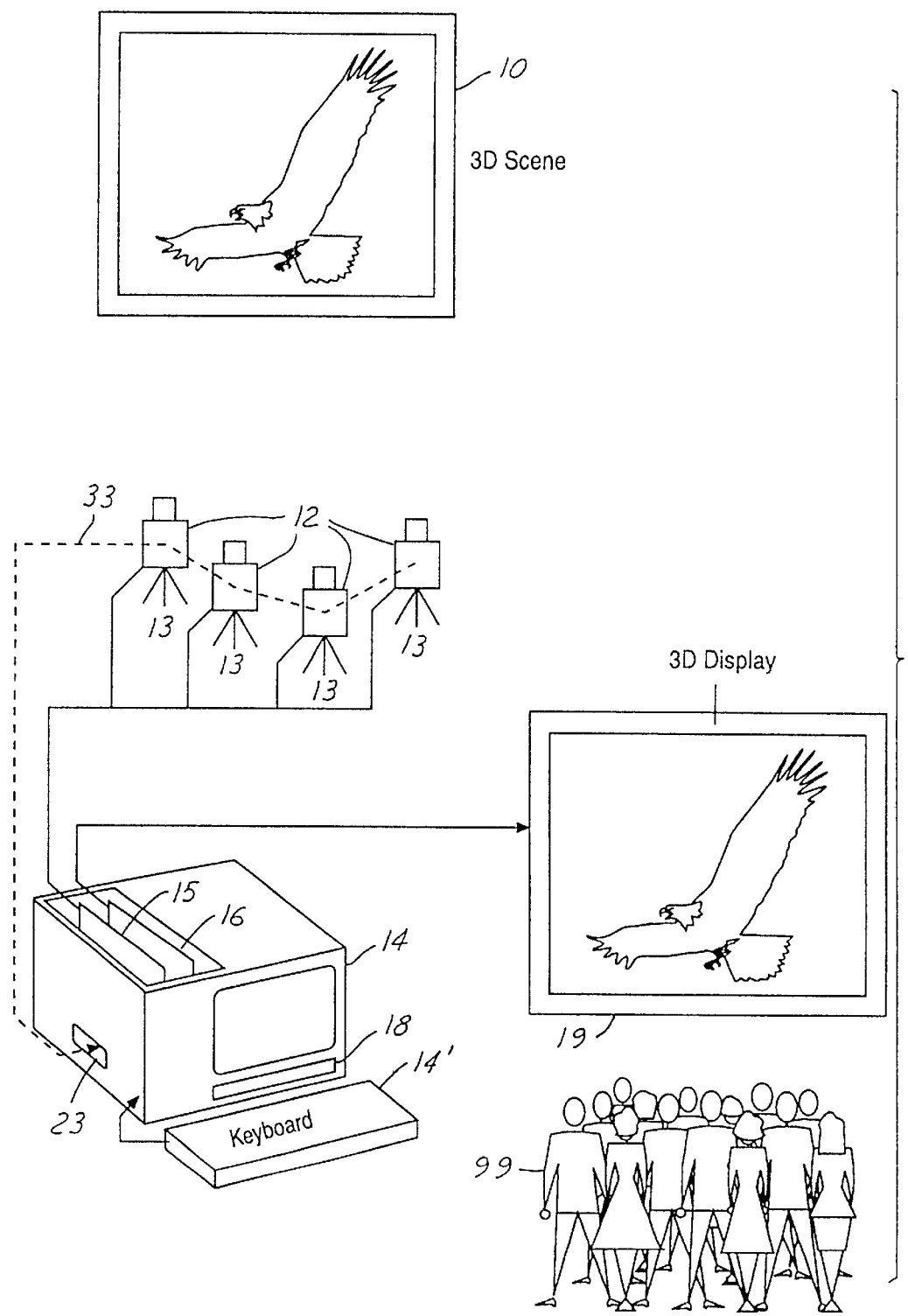
FIG. 1 is a diagram schematically showing the interconnected relation of components of apparatus of the invention.

It should be understood that in FIG. 1, and in FIGS. 3–16, the physical dimensions are not to scale.

DETAILED DESCRIPTION OF THE INVENTION

The invention will be described in detail for a presently preferred embodiment, in conjunction with the accompanying drawings.

The invention is shown in FIG. 1 in application to interconnected components for constructing apparatus for performing methods of the invention, namely for providing three-dimensional display of three-dimensional objects and scenes. Some of these components are commercially available from different sources and will be identified before providing detailed description of their total operation. Other components in FIG. 1 are not commercially available and need to be fabricated using known and currently available technology. In FIG. 1, a three-dimensional still scene 10 to be displayed is shown, and to be surrounded by four stigmatic video cameras, 12, each mounted on a tripod, 13. These four cameras may be identically the same, and are commercially available from Eastman Kodak Company, Rochester, N.Y.; suitably, each of the cameras 12, may be Kodak Megaplus Model ES 1.0, which has the capabilities of having up to 1008×1018 8-bit pixels, although in the presently preferred embodiment 512×480 pixel images are utilized. The 4 stigmatic cameras provide a set of 4 two-dimensional views or images of the three-dimensional scene.

Basic operation is governed by computer means 14, which may be a "PC" computer, such as the "200 MHz Pentium Pro" available from Gateway 2000, Inc., North Sioux City, S.D.; as its designation suggests, this computer contains a 200 MHz clock-pulse generator, and an Intel 686 ("Pentium Pro") processor supplied with 128 megabytes of memory, with provision for keyboard instruction at 14'.

A high accuracy monochrome frame-grabber card 15 is relied upon to digitize and acquire the four images acquired by the four video cameras, respectively. The frame-grabber card is suitably Model DT3152 Data Translation, Marlboro, Mass., and is capable of acquiring up to 4 monochrome video signals.

A card 16 is shown which transmits digital data from the computer means 14 to the digital micromirror device, 19. The card may suitably be a digital input/output board of National Instruments, Austin, Tex., identified by National Instruments part No. AT-DIO-32F. This input/output board has 32 lines of digital input/output divided into four bytes capable of transmitting approximately 900 kilobytes per second.

Figure 2:
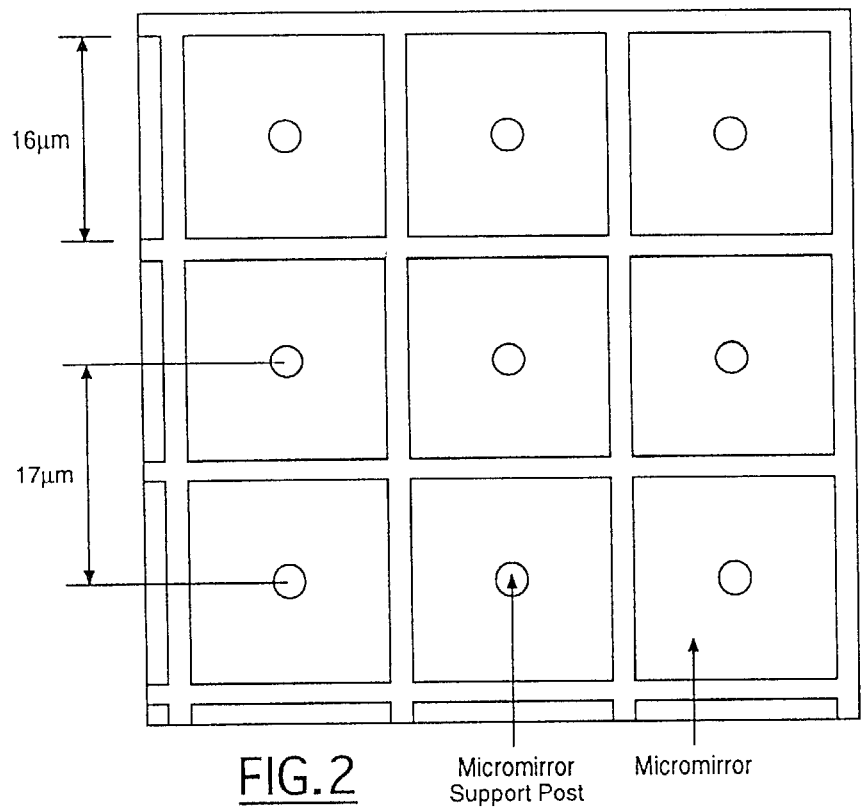
FIG. 2 is an electron micrograph of a reflective light device, the digital micromirror device offered by Texas Instruments, of Dallas, Tex.
Figure 4:
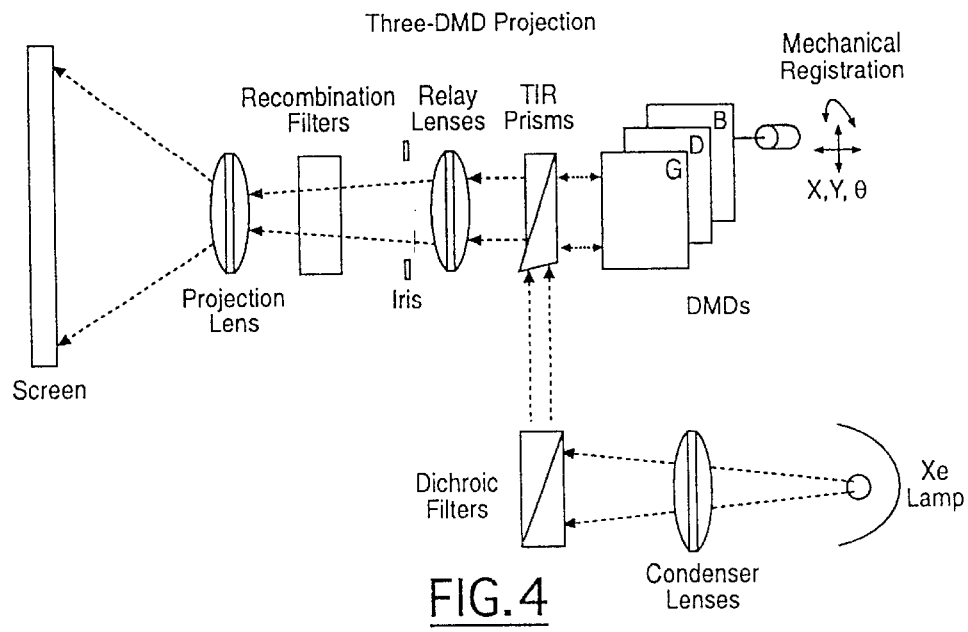
FIG. 4 is a schematic diagram of an appropriately adapted projector based on a reflective light device, the digital micromirror device projector offered by Texas Instruments, Dallas, Tex.
Figure 3:
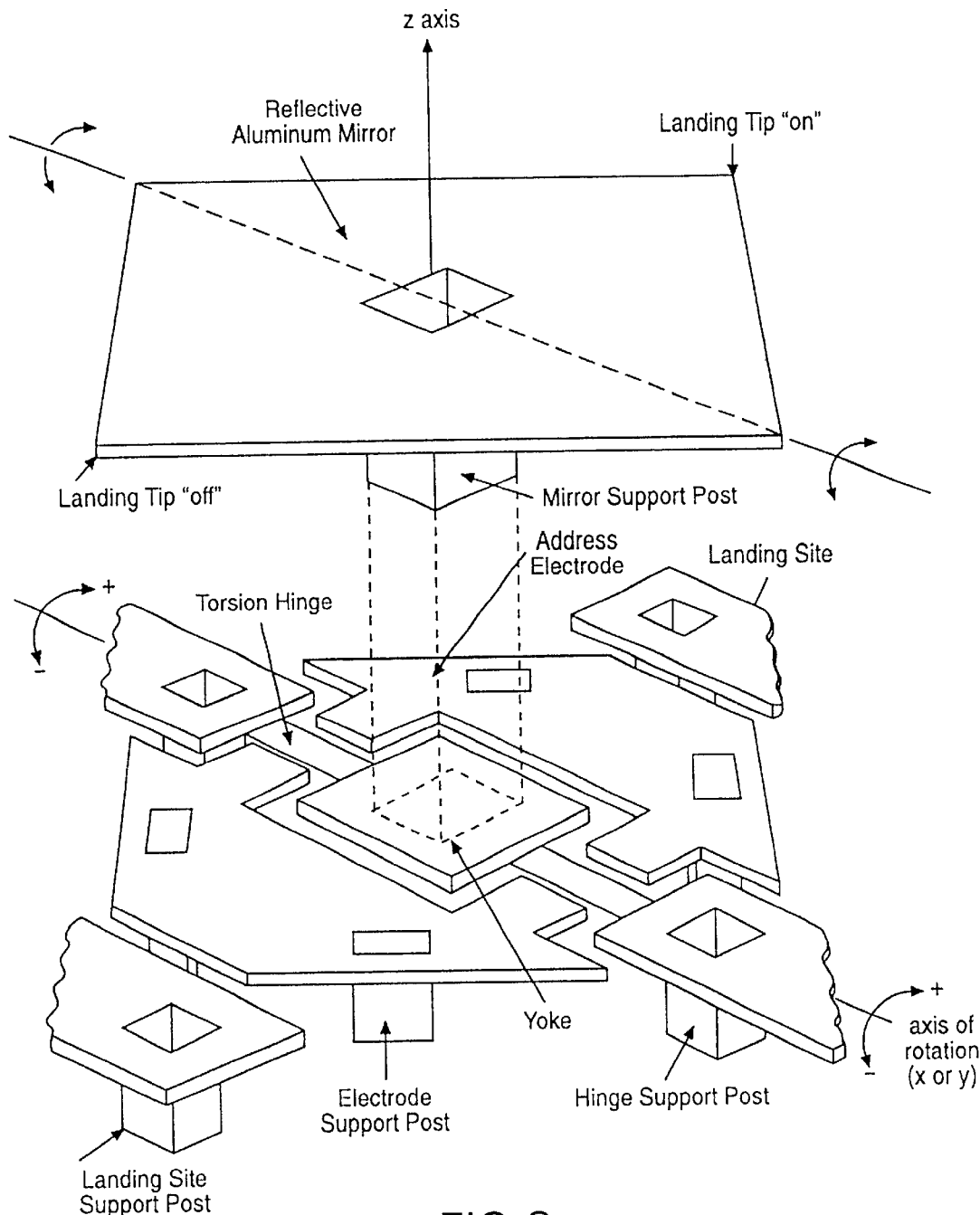
FIG. 3 is an exploded view of a single digital micromirror within the reflective light device offered by Texas Instruments, of Dallas, Tex.
Figure 5:
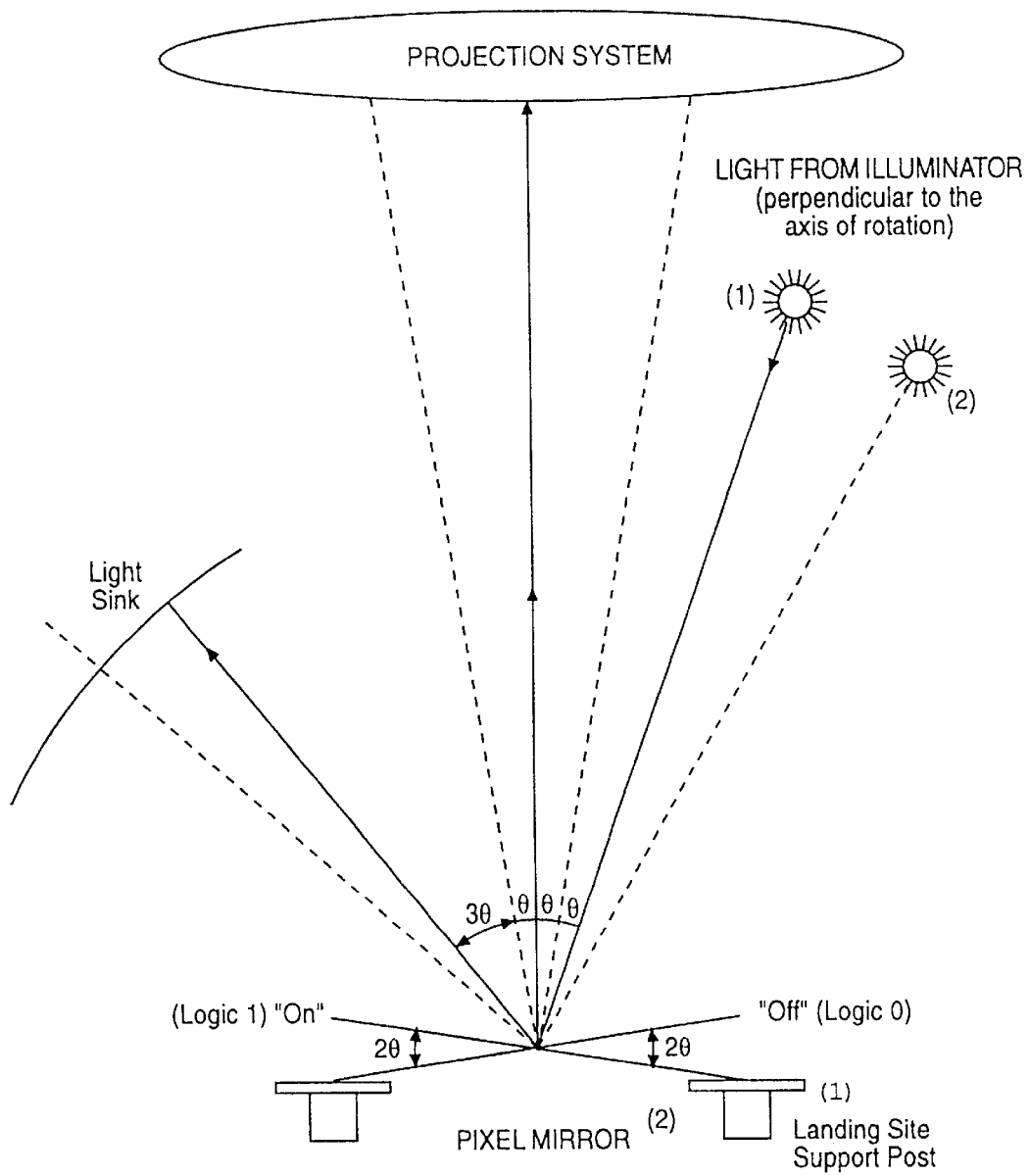
FIG. 5 is a schematic diagram of a single micromirror of the digital micromirror device offered by Texas Instruments, Dallas, Tex. The dotted lines refer to the modification adopted in the present invention.

A reflective light device, 19, is connected to the digital input/output board 16. Although a full description of the reflective light device 19 can be provided, it is more convenient to describe instead a modification of an already available reflective light device, namely the digital micromirror device offered by Texas Instruments, Dallas, Tex. In the standard Texas Instruments reflective light device shown in U.S. Pat. No. 5,061,049 by Hornbeck, issued Oct. 29, 1991, which is incorporated hereinto by reference and shown in FIG. 2 and FIG. 3 and FIG. 4, a set of very small mirrors or micromirrors are electronically controlled to reflect light in one of two possible orientations, namely directly out of the device (i.e., in a direction perpendicular to the surface of the device) or at an angle such that the reflected light is not observed and is absorbed by the light sink. This is shown in FIG. 5, for a single micromirror; as may be seen, the micromirror is positioned against one or the other of two posts of identical height; in the positive logic "1" or "on" position the beam of light is reflected directly towards the viewer, while in the positive logic "0" or off position the beam of light is reflected completely out of view. An image is formed when a large number of identical micromirrors are controlled in an appropriate manner and projected onto an appropriately adapted display screen as shown in FIG. 4; currently, Texas Instruments offers a model with up to 2048×1152=2,359,296 micromirrors. It should be understood that although FIG. 4 represents a color projection system, the operation of a monochrome projection system, as utilized in the currently preferred embodiment, is essentially equivalent.

Figure 6:
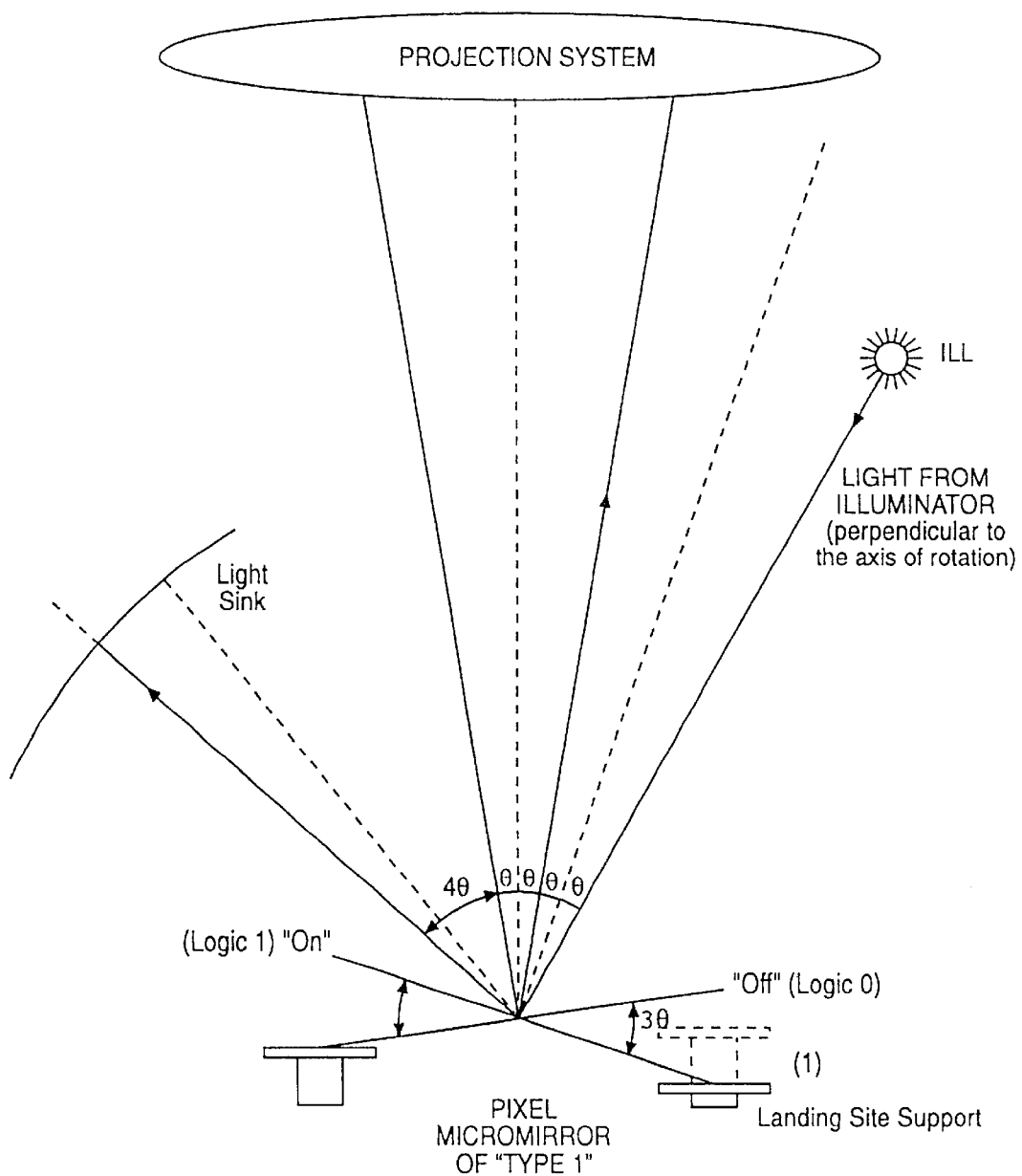
FIG. 6 is a schematic diagram of a single micromirror of "Type 1" associated with the modified reflective light device, 19, of FIG. 1, which shows its modified post height and illumination direction, for the beam of light in the plane orthogonal to the axis of rotation. The dotted lines refer to the standard illumination and post height adopted by Texas Instruments.
Figure 7:
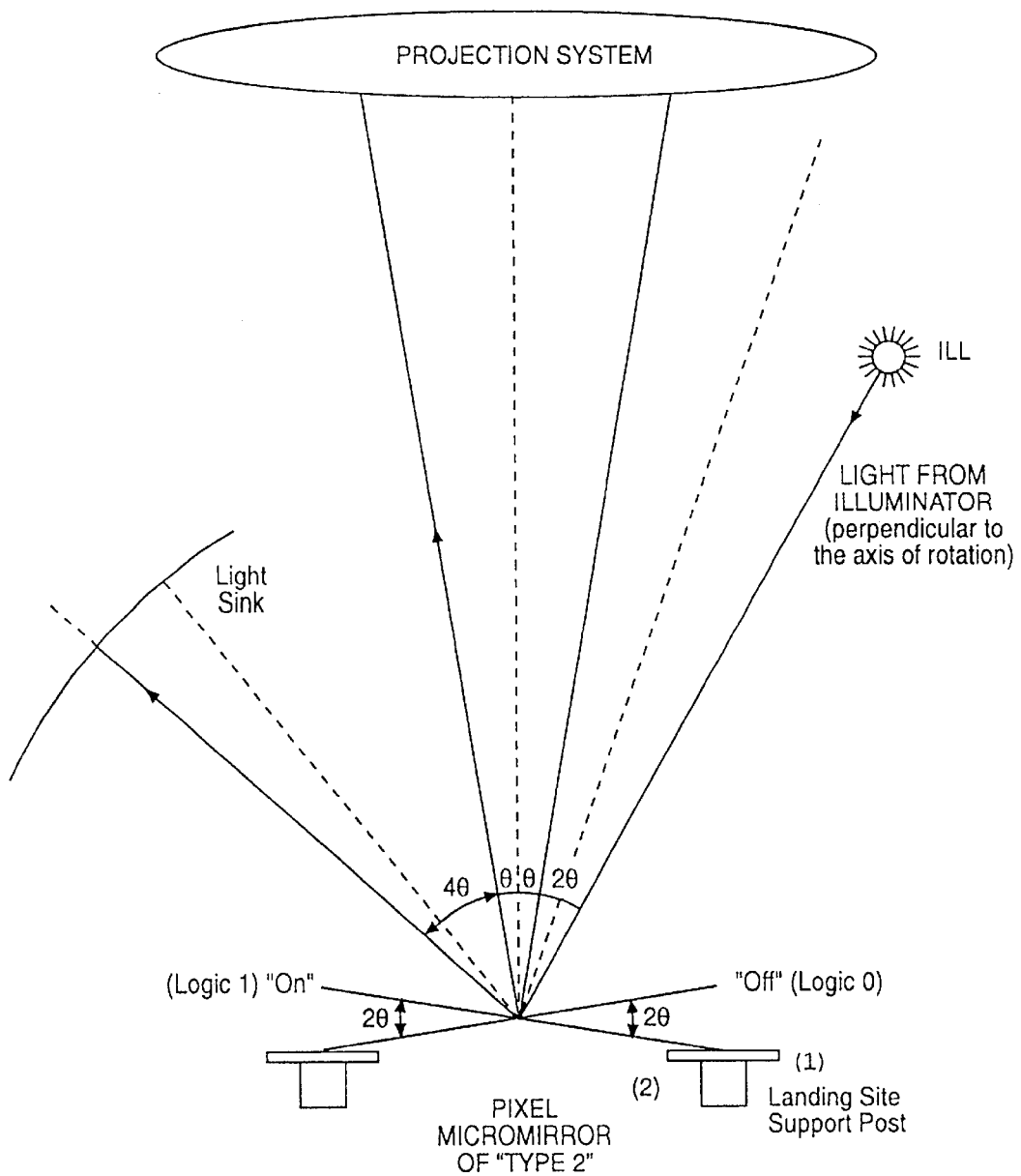
FIG. 7 is a schematic diagram of a single micromirror of "Type 2" associated with the modified reflective light device, 19, of FIG. 1, which shows its modified illumination direction, for the beam of light in the plane orthogonal to the axis of rotation. The dotted lines refer to the standard illumination adopted by Texas Instruments.
Figure 8:
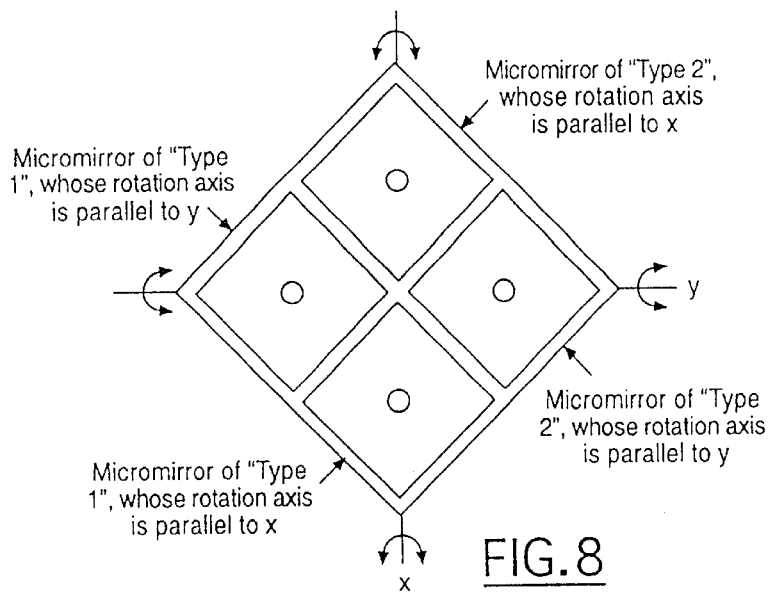
FIG. 8 is a schematic diagram of four micromirrors associated with a single pixel of the modified reflective light device, 19, of FIG. 1. The direction of one of the illuminations is in the y-z plane, and the other is in the x-z plane.
Figure 10:
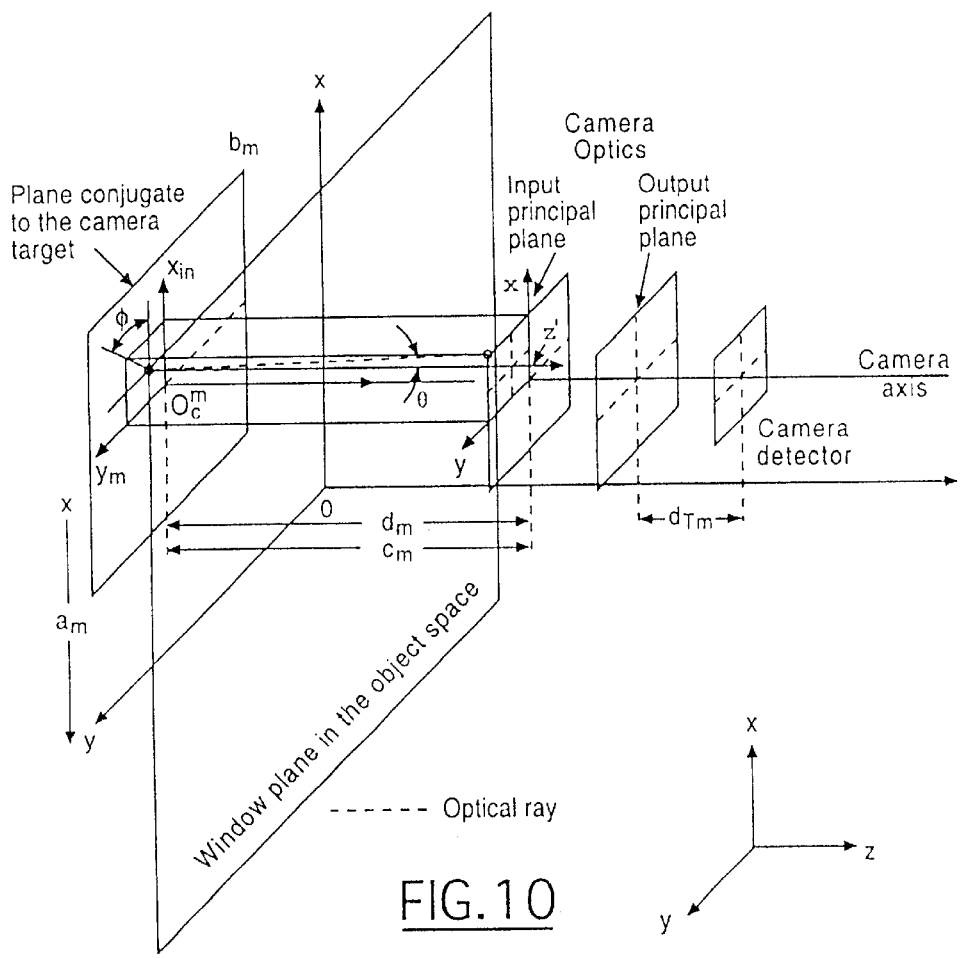
FIG. 10 is a graphical depiction of the coordinates used in the analytic derivation of one presently preferred embodiment of the invention.

In contrast, in the modified reflective light device 19 the beam of light reflected from a particular micromirror when it is in the "on" position is not necessarily directed orthogonally from the display surface, but rather at a specific oblique angle. This is shown in FIG. 6 for a single "Type 1" micromirror and in FIG. 7 for a single "Type 2" micromirror, for a presently preferred embodiment in which 4 micromirrors are used to form a single picture element or pixel. With reference to FIG. 8, the axis of rotation of two micromirrors (one of "Type 1" and the other of "Type 2") are vertical and parallel to the x-axis. The axis of rotation of the other two micromirrors (one of "Type 1" and the other of "Type 2") are horizontal and parallel to the y-axis. As may be seen, "Type 1" micromirrors have unequal post heights while "Type 2" micromirrors have equal post heights. In addition, for both types the angle of illumination is modified as compared to the standard digital micromirror device, as shown in FIG. 6 and FIG. 7. A further modification is the use of not one but two independent sources of illumination impinging on the micromirrors, one source in the x-z plane and one source in the y-z plane. FIG. 8 shows a set of four micromirrors comprising one pixel in the presently preferred embodiment. As may be seen, the beams of light due to the incident illumination in the plane orthogonal to the rotation axis of the micromirrors, when they are in the "on" positions, are reflected at angles of ±θ degrees in each of the vertical and horizontal planes, as illustrated in FIG. 5 and FIG. 6. In the "off" positions the beams of light are reflected completely out of view, and absorbed by the light sinks. Additionally, the beams of light due to the illumination incident on the plane parallel to the rotation axis of the micromirrors when they are in the "on" positions are reflected at angles out of view and absorbed by the light sinks. The radiant power of the reflected light from each micromirror in the reflected light device 19 is controlled by adjusting the duty cycle of the micromirror in terms of its proportion of time in the "on" mode in comparison to the time in the "off" mode. In the currently preferred embodiment, there are N=4 micromirrors in each pixel; each beam reflected by a micromirror within each pixel is directed in one of four directions: +10° vertically, −10° vertically, +10° horizontally and −10° horizontally, in their respective "on" modes; K=512×480= 245,760 pixels; and there are a total of 4×512×480=983,040 micromirrors.

Finally, general signal-processing/display/storage software, for signal processing, control and operation of the computer is not shown but will be understood to be a floppy disk loaded at 18 into the computer; this software is suitably the MATLAB-386, available from The MathWorks, Inc., Natick, Mass. Further software, also not shown, will be understood to include signal-processing, neural-network, and image processing toolboxes, also available from The MathWorks; C++ and Fortran 5.0, available from Microsoft Corporation, Bothell, Wash.; LabView and NI-DAQ, available from National Instruments Corporation, Austin, Tex.; and Frame Grabber SDK, GLOBAL LAB, and GLIDE, available from Data Translation, Marlboro, Mass.

Figure 9:
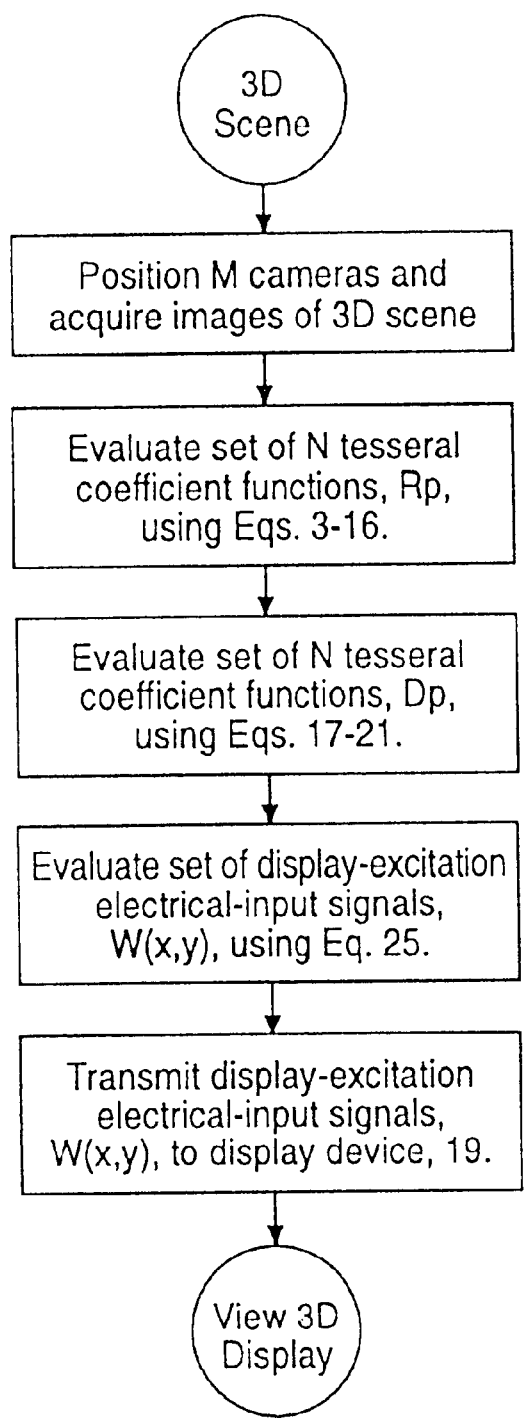
FIG. 9 is a flow chart of computer-controlled operations in providing a three-dimensional display of three-dimensional objects and scenes.
Figure 11:
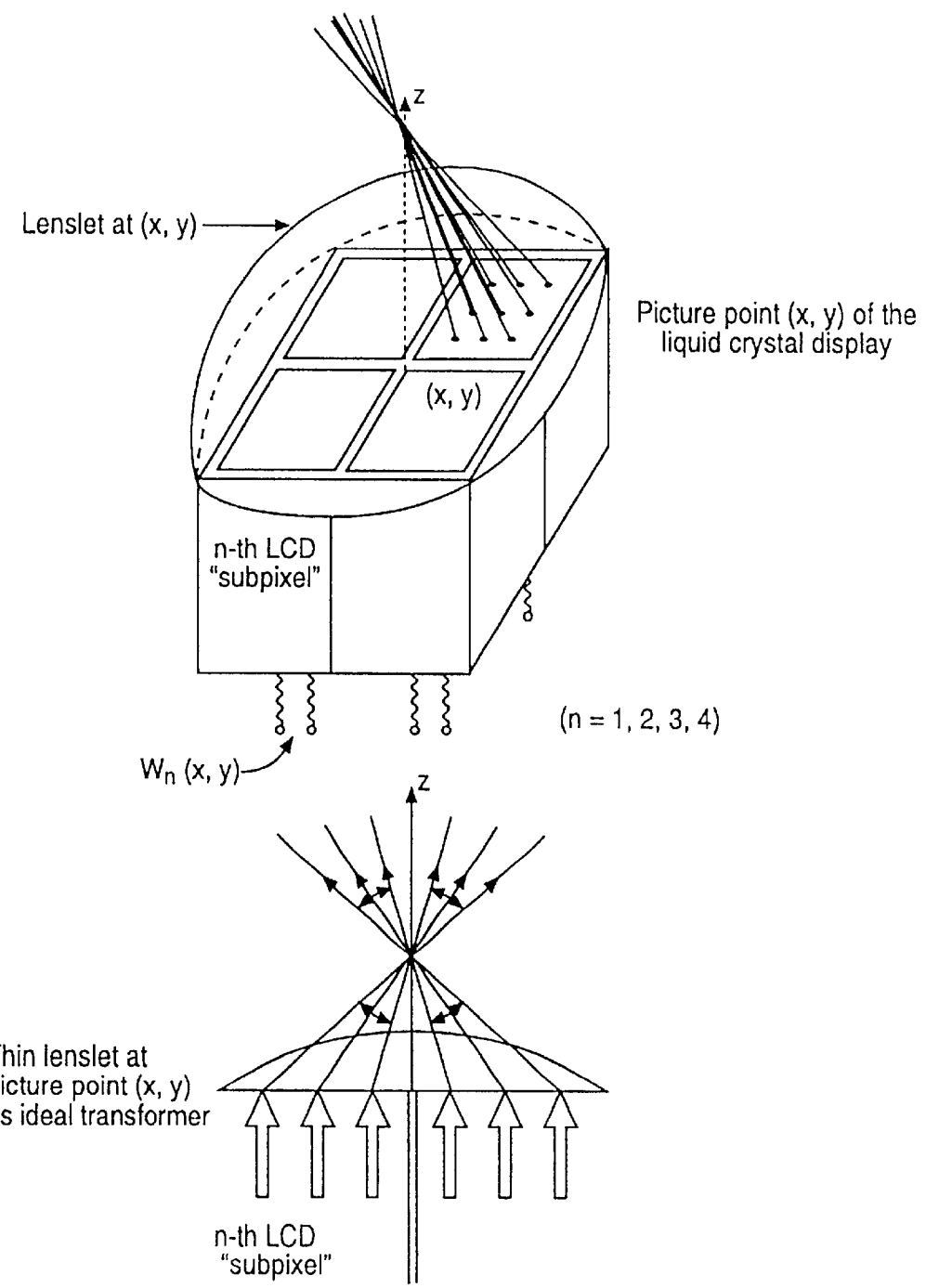
FIG. 11 is a schematic diagram showing another display embodiment, based on a liquid crystal display.

In the presently preferred embodiment of the invention and with additional reference to the flow diagram of FIG. 9, data is collected and processed as follows. A three-dimensional still scene (10) comprised of three-dimensional objects is recorded using a set of M=4 video stigmatic cameras (12) each mounted on a tripod (13), and facing the scene from four distinct locations. The set of four two-dimensional images acquired using the video cameras (12) are downloaded to the computer (14) using frame grabber card (15). These four images are denoted as $L_m(i,j)$, m=1, 2,3,4, and i and j denote the pixel (i,j) associated with the image stored in the memory of computer (14). The three-dimensional scene is characterized in terms of the radiance, R, at a reference planar window at z=0 in the object space. An expansion of the radiance, R, in terms of tesseral harmonics is then evaluated using the four images, $L_m(i,j)$, m=1,2,3,4; these are used to compute a set of four tesseral coefficient functions, $R_q(x_{m,i}, y_{m,j})$ q=1,2,3,4, where $x_{m,i}$ and $y_{m,j}$ are the coordinates associated with the planar window. Note that $x_{m,i}=2d\mu_m i$ and $y_{m,j}=2d\mu_m j$, where 2d is the size of the picture element (pixel) of the camera detector, and $\mu_m$ is the transverse magnification associated with the optics of the $m^{th}$ camera. It should be understood, and with additional reference to FIG. 10, that if $d_m$ is the distance between the input principal plane of the $m^{th}$ camera optics and the plane conjugate to the $m^{th}$ camera detector, and if $d_{Tm}$ is the distance between the output principal plane of the $m^{th}$ camera optics and the $m^{th}$ camera detector, then $\mu_m = d_m/d_{Tm}$.

In a similar manner, the radiance function, D, associated with display (19) is also expressed in terms of a tesseral harmonic expansion, whose coefficient functions are denoted by $D_q(x_i,y_j)$, q=1, 2, . . . , N, where N=4 in the presently preferred embodiment. It should be understood that for this embodiment there is a one-to-one correspondence between the size of the planar window and the display. It is further understood that the functions $D_q(x_i,y_j)$, q=1,2, 3,4, are linear functions of a set of display-excitation electrical-input signals, $W_q(x_i,y_j)$, q=1,2,3,4, which are proportional to the radiant power of the corresponding micromirror; thus, $D_q(x_i,y_j)$ may be expressed as a linear function of $W_q(x_i,y_j)$ It should be additionally understood that the set of N=4 display-excitation electrical-input signals, $W_q(x_i,y_j)$, q=1,2,3,4, are used to control the amount of light reflected from the four micromirrors q, q=1,2,3,4, at pixel $\{x_i,y_j\}$. As already noted, in the currently preferred embodiment of the invention, i=1, . . . 480, and j=1, . . . 512, making for a total of 245,760 pixels in the display, and 4×245,760=983,040 micromirrors in reflected light device (19).

The set of values for the display-excitation electrical-input signals, $W_q(x_i,y_j)$, q=1,2,3,4, i=1, . . . 480, and j=1, . . . 512, are evaluated and transferred from computer memory to digital input/output card (15) for transmission to reflected light device (19). The planar display (19), upon input of the set of display-excitation electrical-input signals, produces a displayed image similar to that seen when viewing the original three-dimensional scene (10), whereby achieving the indicated objectives. It should be further understood that the display may be viewed by observers (99) from a continuum of locations in front of the display, thus enabling full multiviewpoint as well as autostereoscopic capabilities.

The preceding description has proceeded on the basis that a tesseral harmonic expansion can be utilized for deriving a set of display-excitation electrical-input signals suited for driving the reflective light display. The discussion has also assumed that the relationship between the display-excitation electrical-input signals and the coefficient functions $D_q(x_i, y_j)$, q=1,2,3,4 are linear functions of the display-excitation electrical-input signals, $W_q(x_i,y_j)$, q=1,2,3,4. These facts are demonstrated as follows.

The proof of the above statements is rooted in a fundamental insight which led the present inventors to their current invention. This insight is that any three-dimensional scene composed of three-dimensional objects when viewed through a planar window can be considered to be equivalent to a planar screen coincident with the planar window whose radiance is identical to the radiance of the three-dimensional scene itself at that planar window. As a clarifying example, it may be convenient to consider this representation in terms of the image which would be produced by a planar mirror which is reflecting light from a set of objects located in an appropriate position in front of the planar window. According to this observation, and with additional reference to FIG. 10, we can express, using a generalized version of Lambert's law (see, for example, *Handbook of Optics, Devices, Measurements and Properties, Second Edition, Vol. II*, Michael Bass, Editor-in-Chief, published by McGraw Hill, New York, N.Y., Chapter 24), the total light power in watts [W], $L_m(i,j)$, received by pixel (i,j) of the detector of stigmatic camera m, m=1,2,3,4. The expression, assuming an arbitrarily small pixel size, may be approximated by:

$$L_m(i,j)=4d^2\mu_m^2 \int\int R(x_{m,i}+a_m,y_{m,j}+b_m,\theta,\phi)\cos\theta\sin\theta d\phi d\theta \quad (1)$$

In Eq. (1), $R(x_{m,i}+a_m,y_{m,j}+b_m,\theta,\phi)$, in units of watts per square meter per steradian solid angle [$Wm^{-2}sr^{-1}$], is the local radiance at the reference planar window at ($x_{m,i}+a_m$, $y_{m,j}+b_m$), and $a_m$ and $b_m$ are the respective horizontal and vertical shifts associated with the cameras 12, for each of the M=4 positions. The angles $\theta$ and $\phi$ are local spherical coordinates taken with respect to polar axis z' through (x,y,0) and parallel to z, and the integration in Eq. 1 is carried out for the rays ($\theta,\phi$) which enter the pupil of the $m^{th}$ camera. In the presently preferred embodiment, the window is located at the plane z=0 of the object space coordinates, which are coincident with the camera coordinates, apart from the transverse shifts $a_m$ and $b_m$. The window plane is conjugate to the detector plane of each camera. The distance both of the origin of the camera coordinates and of the camera imaging plane itself from the input principal plane of each camera optics is $c_m$; hence, $c_m=d_m$ in the presently preferred embodiment which utilizes stigmatic cameras.

A key factor to the present invention is the recognition that the function $R(x,y,\theta,\phi)$ can be expanded in tesseral harmonics at each point (x,y)(see for example the book *Electromagnetic Theory*, J. A. Stratton, McGraw Hill, New York, 1941, pp. 399–408):

$$R(x, y, \theta, \phi) = \sum_{p=1}^{\infty} R_p(x, y) Y_p(\theta, \phi) \quad (2)$$

In Eq. (2), the $Y_p(\theta,\phi)$ are known orthogonal functions of $\theta$ and $\phi$ (actually of cos $\theta$, sin $\theta$, cos $\phi$ and sin $\phi$); their definitions can be found also on p. 332, note 2, in *Handbook of Mathematical Functions*, M. Abramowitz and I. A.

Stegun, Dover Publications, New York, 1965, ninth printing. Combining Eqs. 1 and 2, one has:

$$L_m(i,j) = 4d^2 \mu_m^2 \int_{-P_x}^{P_x} \int_{-P_y}^{P_y} \sum_{p=1}^{\infty} R_p(x_{m,i} + a_m, y_{m,j} + b_m) K_p(X - x_{m,i}, Y - y_{m,j}, c_m) dX dY \qquad (3)$$

The dimensions of the camera pupil at the input principal plane of the camera, where the double integration in Eq. 3 is carried out, are $2P_x$ and $2P_y$, respectively. The functions $K_p$ are given by:

$$K_p(X - x_{m,i}, Y - y_{m,j}, c_m) = Y_p(\theta, \phi) \cos^2 \frac{\theta}{r_{m,ij}^2} \qquad (4)$$

where $$r_{m,ij}^2 = (X - x_{m,i})^2 + (Y - y_{m,j})^2 + c_m^2 \qquad (5)$$

The angles $\theta$ and $\phi$ are defined through the following set of equations:

$$\cos\theta = \frac{c_m}{r_{m,ij}} \qquad (6)$$

$$\sin\theta = \frac{\sqrt{(X - x_{m,i})^2 + (Y - y_{m,j})^2}}{r_{m,ij}} \qquad (7)$$

$$\cos\phi = \frac{(X - x_{m,i})}{\sqrt{(X - x_{m,i})^2 + (Y - y_{m,j})^2}} \qquad (8)$$

$$\sin\phi = \frac{(Y - y_{m,j})}{\sqrt{(X - x_{m,i})^2 + (Y - y_{m,j})^2}} \qquad (9)$$

Now Eq. 3 can be written as a summation of convolutions:

$$L_m(i,j) = 4d^2 \mu_m^2 \sum_{p=1}^{\infty} \int_{-P_x}^{P_x} \int_{-P_y}^{P_y} R_p(x_{m,i} + a_m, y_{m,j} + b_m) K_p(X - x_{m,i}, Y - y_{m,j}, c_m) dX dY \qquad (10)$$

With respect to Eq. 10, it should be noted that: (i) all the $K_p$ are known a priori, given by Eq. 4; (ii) $L_m(i,j)$ represents the measurements, i.e., the pixel values associated with the video cameras; (iii) the integration is with respect to the variables X and Y, and thus $R_p$ may be taken outside the double integral; and (iii) if the summation is truncated at some value $N<\infty$, and assuming that $M \geq N$ images at M distinct sets of values of $\{a,b,c\}$ were acquired (i.e., at M distinct horizontal, vertical, and longitudinal shifts, for example $\{a_1, b_1, c_1\}, \ldots, \{a_m, b_m, c_m\}, \ldots, \{a_M, b_M, c_M\}$), then a linear set of equations associated with Eq. 5 can be derived and solved to obtain an estimate of the set of functions $R_p(x_i, y_j)$, p=1,2, ... ,N, where $x_i$ and $y_j$ are the associated pixel locations in the display. In the case when M>N, an overdetermined set of equations results; in the case when M=N, a square set of equations results; in both cases, a least squares solution may be found. It should be understood that the estimate of $R_p(x_i, y_j)$ will not be distinguished herein from $R_p(x_i, y_j)$ itself, although it is obvious that the two will be different, due both to the finite truncation of the summation as well as the presence of noise. It should be further understood that in this analysis the M two-dimensional views of the three-dimensional scene were assumed to be acquired at M distinct locations, the locations being arranged such that the cameras are all directed in a parallel fashion towards the three-dimensional scene. It should be clear however that this represents no loss of generality in terms of the currently preferred embodiment of the invention; in particular images can be obtained from cameras arranged in non-parallel or "tilted" orientations.

Assume now that the summation in Eq. 10 is truncated at N terms, and that N two-dimensional images are acquired at M=N distinct sets of values of $\{a,b,c\}$, i.e., $\{a_1, b_1, c_1\}, \ldots \{a_m, b_m, c_m\}, \ldots \{a_N, b_N, c_N\}$,). Then Eq. 10 may be expressed as:

$$L_m(i - \alpha_m, j - \beta_m) = \sum_{p=1}^{N} R_p(i,j) G_{pm}(i,j) \qquad (11)$$

where $$G_{pm}(i,j) = 4d^2 \mu_m^2 \int_{-P_x}^{P_x} \int_{-P_y}^{P_y} K_p(X - x_{m,i}, Y - y_{m,j}, c_m) dX dY \qquad (12)$$

$$\alpha_m = \frac{a_m}{2d\mu_m} \qquad (13)$$

$$\beta_m = \frac{b_m}{2d\mu_m} \qquad (14)$$

Note that m=1, ... ,N and p=1, ... ,N, N=4, and $a_m$, $b_m$ are chosen so that $\alpha_m$ and $\beta_m$ are both integer numbers, in the presently preferred embodiment. It should be understood that for ease of notation $R_p(i,j)$ denotes the value of the tesseral coefficient function $R_p(x,y)$ at $x=x_{m,i}$ and $y=y_{m,j}$. Now letting $L(i,j)=[L_1(i-\alpha_1, j-\beta_1) \ldots L_m(i-\alpha_m, j-\beta_m) \ldots L_N(i-\alpha_n, j-\beta_N)]^T$, $R(i,j)=[R_1(i,j) \ldots R_n(i,j) \ldots R_N(i,j)]^T$, and $G(i,j)=[G_{np}(i,j)]$, an N×N matrix, Eq. 11 may now be written as the matrix expression $$L = G R \qquad (15)$$

where for convenience we have dropped the explicit dependence on (i,j). Thus the functions $R_p(I,j)$ are evaluated through inversion of Eq. 15, namely, $$R = G^{-1} L \qquad (16)$$

The above inversion is repeated for each pixel (i,j) in the display in order to obtain the estimated set of tesseral coefficient functions, $R_p(i,j)$, p=1,2, ... ,N, i=1, ... 480, j=1, ... 512, associated with the three-dimensional scene.

Next, a corresponding analysis is applied to the display itself, the reflected light device 19, whose radiance function is represented by the function, $D(x,y,\theta,\phi)$. It should be understood that (i) each picture point (pixel) at (x,y) is composed of N independent light sources, i.e., the N micromirrors, which emit N independent beams of light; and (ii) each of the N beams of light is characterized by its associated radiance $W_i(x,y)B_i(\theta,\phi)$, where $W_i(x,y)$, the display-excitation electrical-input signal, is the normalized radiant power of the $i^{th}$ beam, i=1, ... ,N, and $B_i(\theta,\phi)$ is related to the intensity pattern of the $i^{th}$ beam. Then, in view of the above two factors in conjunction with the fact that the light radiated from the display is incoherent, the radiance function, $D(x,y,\theta,\phi)$ [$Wm^{-2}sr^{-1}$], may be represented by the following summation:

$$D(x, y, \theta, \phi) = \sum_{p=1}^{N} W_p(x, y) B_p(\theta, \phi) \quad (17)$$

In Eq. 17, $W_p(x,y)$ is the normalized radiant power (i.e., $0 \leq W_p(x,y) \leq 255$) of the $p^{th}$ reflected light beam, $B_p(\theta,\phi)$ [$Wm^{-2}sr^{-1}$], from pixel (x,y), that is, the light power radiated by one of the N micromirrors located at pixel (x,y). The functions, $B_p(\theta,\phi)$, p=1,2, . . . ,N can be expressed as a tesseral harmonic expansion:

$$B_p(\theta, \phi) = \sum_{q=1}^{\infty} s_{pq} Y_q(\theta, \phi) \quad (18)$$

In Eq. 18, $s_{pq}$ are the tesseral coefficients associated with the tesseral expansion, and $Y_q(\theta,\phi)$ are the known orthogonal functions introduced earlier. The tesseral coefficients, $s_{pq}$, can be evaluated using the equations provided in *Electromagnetic Theory*, J. A. Stratton, McGraw Hill, New York, 1941, p. 403, Eqs. 18–19, and which are included by reference hereinto. Combining Eqs. 17 and 18, one obtains $$D(x, y, \theta, \phi) = \sum_{q=1}^{\infty} \left[ \sum_{p=1}^{N} s_{pq} W_p(x, y) \right] Y_q(\theta, \phi) \quad (19)$$

$$= \sum_{q=1}^{\infty} D_q(x, y) Y_q(\theta, \phi)$$

where $$D_q(x, y) = \sum_{p=1}^{N} s_{pq} W_p(x, y), q = 1, 2, 3, \ldots \quad (20)$$

It should be understood that Eq. 20 represents a linear relationship between the normalized radiant powers, $W_p(x,y)$, associated with the micromirrors of the display, and the tesseral coefficient functions, $D_q(x,y)$. The normalized radiant powers, $W_p(x,y)$, associated wish the micromirrors in the display, can now be evaluated by setting the first N tesseral coefficient functions for the display equal to the N tesseral coefficient functions of the three-dimensional scene, namely:

$$R_q(x,y) = D_q(x,y), q=1, \ldots, N. \quad (21)$$

Combining Eq. 21 with Eq. 20 gives:

$$R_q(x, y) = \sum_{p=1}^{N} s_{pq} W_p(x, y), q = 1, \ldots N \quad (22)$$

or in matrix form $$R(x,y) = S\,W(x,y) \quad (23)$$

where $R(x,y) = [R_1(x,y)\, R_2(x,y) \ldots R_N(x,y)]^T$, $W(x,y) = [W_1(x,y)\, W_2(x,y) \ldots W_N(x,y)]^T$, $S=[s_{ij}]$, the N×N matrix of coefficients, $s_{ij}$, and $^T$ denotes matrix transpose. It should be understood that the normalized radiant powers represented by column vector, $W(x,y)$, are the set of display-excitation electrical-input signals which are transferred from the computer to the reflected light device in order to form the three-dimensional image.

The solution of Eq. 23 provides the values of the normalized radiant powers associated with the micromirrors in the reflected light device, i.e., $W(x,y)$, is given by $$W(x,y) = S^{-1} R(x,y) \quad (24)$$

where $S^{-1}$ is the inverse matrix associated with S, and it should be understood that x and y represent the locations in the display corresponding to the planar window. Finally, using Eq. 16 together with Eq. 24 provides the following complete solution:

$$W = (G\,S)^{-1} L \quad (25)$$

where for convenience we have dropped the (x,y) notation. Eq. 25 provides the set of display-excitation electrical-input signals for input to the display 19. It should of course be understood that the values obtained in Eq. 25 for W are to be normalized to the range 0 to 255, in accordance with the 8 bit data word associated with the digital input/output card and reflected light device of the currently preferred embodiment. It should further be understood that connecting the values W determined from Eq. 25 to the reflected light display device produces the desired three-dimensional view of the three-dimensional scene, thereby achieving the indicated objectives. An additional point to be understood is that the disclosed invention can be used for either still three-dimensional scenes, or for dynamic three-dimensional scenes, i.e., three-dimensional television or video. In the latter case, the processing must be implemented in or close to "real-time". For this, the techniques described in the book *Introduction to Parallel and Vector Solution of Linear Systems*, by James M. Ortega, published by Plenum Press, New York, N.Y., in 1988, and included by reference hereinto, can be utilized to solve Eq. 25. Other high-speed computational approaches and ad hoc hardware microelectronics may be utilized as well.

It should be understood that the above procedure can be generalized by choosing a number, Q, of tesseral harmonics associated with Eqs. 11, 21, and 22, where $Q \geq N$. It is thus to be understood that the length of the column vector $R(x,y)$ is Q, and the matrices G and S are N×Q and Q×N matrices, respectively, so that the matrix product GS and its inverse $(GS)^{-1}$ are N×N matrices. This can also be extended to the case of M>N (i.e., a number of cameras, M, greater than the number of degrees of freedom, N, in each pixel of the display device), in which G becomes M×Q, and the inverse operation in Eq. 25 should be appropriately interpreted as a pseudoinverse operation. An excellent reference on the solution of such overdetermined systems can be found in the book Solving *Least Squares Problems*, by C. L. Lawson and R. Hanson, published by Prentice Hall of Englewood, N.J. in 1974, and which is included by reference hereinto.

It should be additionally understood that N is the number of independent degrees of freedom in each pixel of the display device. Hence, in the general case, the digital micromirror device may be modified so that each pixel is comprised of a set of N distinct micromirrors with, in general, up to N distinct post heights (e.g., "Type 1", "Type 2", . . . , "Type N") and of a suitable set of illuminations; in this case the beams of light reflected from each mirror is oriented in one of N distinct "on" directions. The reflected light device 19 is further specified to be composed of a total of K discrete pixels. Further, each of the K pixels in the modified digital micromirror device are equivalent in terms of the N distinct micromirrors of which they are each comprised. Thus it should be realized that any number, N, of micromirrors associated with each pixel can be used, any number, M, of cameras can be used, and any number, Q, of terms in the tesseral harmonic scene and display expansions can be used, with the understanding that $M \geq N$ and $Q \geq N$.

It should further be understood that the reflected light device 19 of FIG. 1 is used in conjunction with an appropriate projection screen and associated electronics and optics, as schematically diagramed in FIG. 4. It should be additionally understood that display devices other than the reflected light device can be used as part of the three-dimensional display system. For example, and with additional reference to FIG. 11, an alternative preferred embodiment of the present invention uses a liquid crystal display (LCD) device to display the three-dimensional image. In this alternative embodiment, a pixel in the LCD device is comprised of a set of N "subpixels" (a "subpixel" being understood to be an ordinary pixel in a standard LCD), together with a set of optical transformers. The optical transformers are thin lenslets, constructed such that a parallel ray impinging at $(x_p, y_p)$ on the lenslet emerges at an angle, $\theta_p$. A "subpixel" in the LCD whose center is located at $(x_p, y_p)$ produces an emerging beam $W_p B_p(\theta, \phi)$ centered around $\theta_p$. It is to be understood that a similar analysis as carried out for the reflective light display can also be carried out for the LCD-lenslet display, i.e., using Eqs. 17–20 and thereby achieving an alternative preferred embodiment of the present invention. A useful reference on the subject of liquid crystal displays can be found in the reference *Handbook of Optics, Devices, Measurements and Properties, Second Edition, Vol. I*, Michael Bass, Editor-in-Chief, published by McGraw Hill in 1995, New York, N.Y., Chapter 27, pp. 27.36–27.44, and which is incorporated by reference hereinto. A recent advance in three-dimensional display devices is shown in U.S. Pat. No. 5,493,427 by Nomura et al., issued Feb. 20, 1996, and which is incorporated hereinto by reference. This device utilizes a liquid crystal display panel and an attached electronically variable lens. In an alternative embodiment of the present invention, this display device is used to receive the set of display-excitation electrical-input signals provided herein in Eq. 25.

Figure 12:
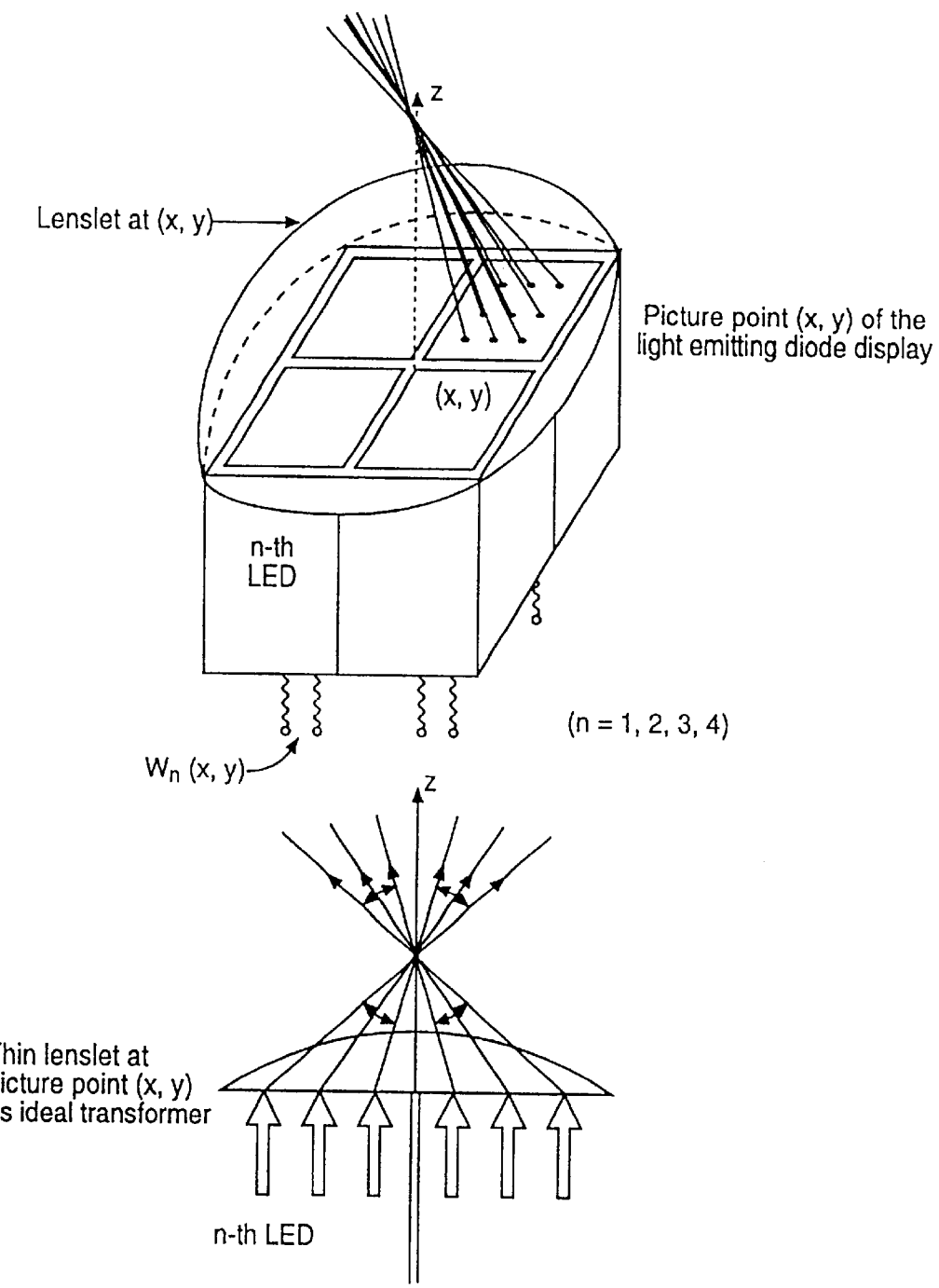
FIG. 12 is a schematic diagram showing another display embodiment, based on light emitting diodes.

In yet another alternative embodiment, and with additional reference to FIG. 12, a set of light-emitting diodes (LED's) together with a set of optical transformers is used to realize the three-dimensional display device. In this alternative embodiment, the optical transformers are thin lenslets, constructed such that a parallel ray impinging at $(x_p, y_p)$ on the lenslet emerges at an angle, $\theta_p$. An LED whose center is located at $(x_p, y_p)$ produces an emerging beam $W_p B_p(\theta, \phi)$ centered around $\theta_p$. It is to be understood that a similar analysis as carried out for the reflective light display can also be carried out for the LED-lenslet display, i.e., using Eqs. 17–20 and thereby achieving an alternative embodiment of the present invention. A useful reference on the subject of light emitting diodes can be found in the reference *Handbook of Optics, Devices, Measurements and Properties, Second Edition, Vol. I*, Michael Bass, Editor-in-Chief, published by McGraw Hill in 1995, New York, N.Y., Chapter 12, and which is incorporated by reference hereinto. A recent advance in the engineering of LEDs is the development of transparent organic LEDs (TOLEDs). These devices, which can generate light in the red, green and blue spectral regions, can be used in the construction of a suitable display device using the principles disclosed herein. A useful reference for TOLEDs entitled "Transparent light emitting devices" may be found in *Nature*, Vol. 380, Mar. 7, 1996, p. 29, by V. Bulovic et al., and is incorporated by reference hereinto. It is also to be noted that a display comprised of suitably arranged bundles of optical fibers can serve as the basis for constructing the display device. Each optical fiber bundle realizes a single pixel. A useful reference on the subject of miniature and micro-optical means can be found in the reference *Handbook of Optics, Devices, Measurements and Properties, Second Edition, Vol. II*, Michael Bass, Editor-in-Chief, published by McGraw Hill, New York, N.Y., Chapters 7, 8 and 10, and which is incorporated by reference hereinto. A general reference on display systems can be found in the publication "Cameras and Display Systems" by Yoshitaka Hashimoto et al., in the *Proceedings of the IEEE*, Vol 83, No. 7, July 1995, pp. 1032–1043. It is therefore to be understood that the principles disclosed herein, namely the decomposition in terms of tesseral harmonics of the scene and display radiances, respectively, can be adapted to any number of display device embodiments with the understanding that the specific display embodiment utilized provides a means for independently controlling the angular distribution of the light emitted from each pixel. It is further to be understood that there is no limitation on the number of independent degrees of freedom, N, associated with any specific display device embodiment to be used in the present invention, or with the number of cameras used, or with the number of terms used in the tesseral harmonic expansions, with the conditions that $M \geq N$ and $Q \geq N$. It is to be realized that increasingly larger values of M, N, and Q will generally lead to three-dimensional display of three-dimensional scenes of increasingly higher quality.

Figure 13:
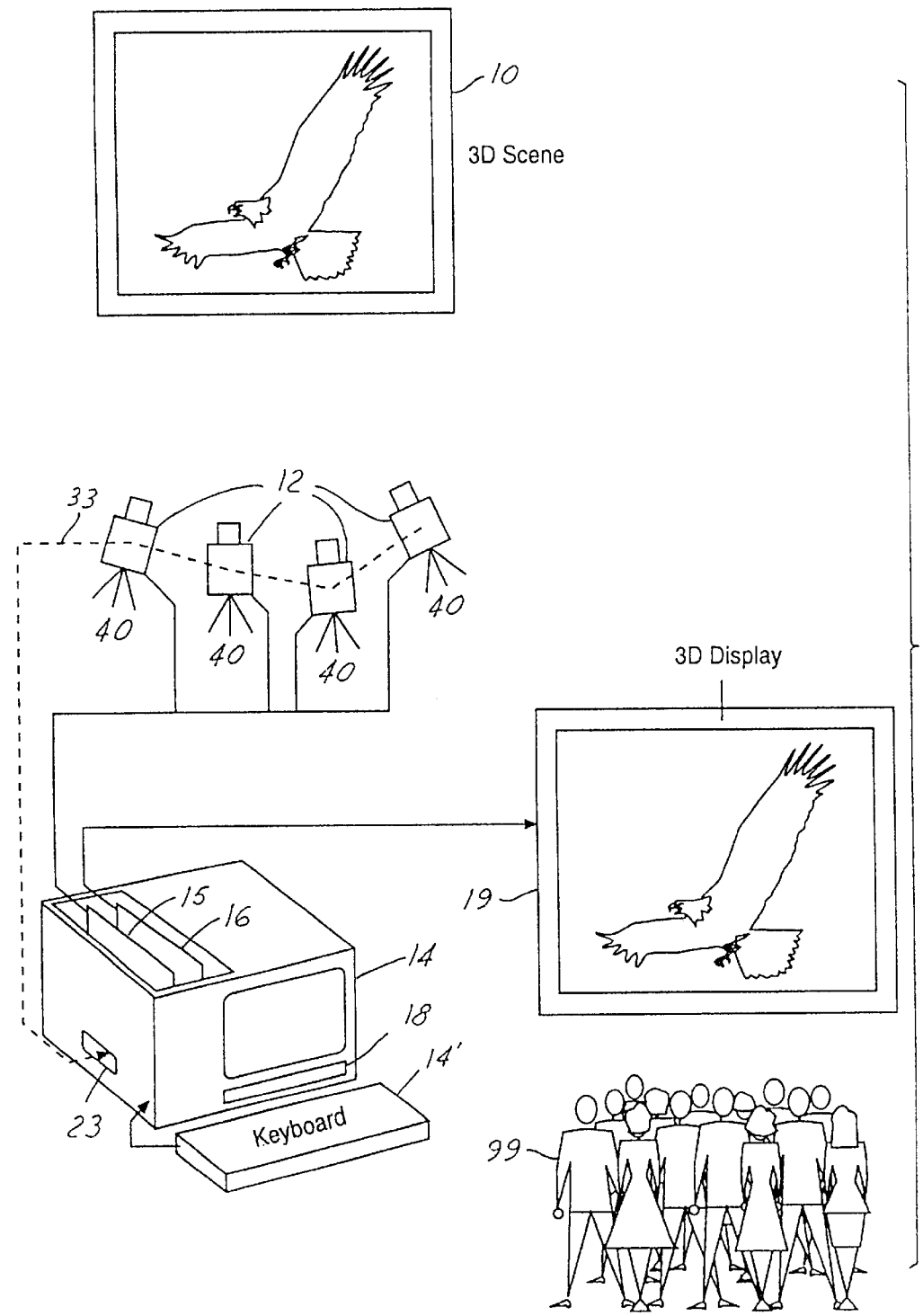
FIG. 13 is a schematic diagram showing another embodiment, similar to that shown in FIG. 1, except that some of the stigmatic cameras are now tilted with respect to the three-dimensional scene.

In another embodiment of the invention, the cameras are not oriented parallel to one another, as shown in FIG. 1. In this alternative embodiment, and as shown in FIG. 13, the cameras are maintained in a set of "tilted" or oblique positions with respect to one another. It may be readily understood that a similar analysis may be carried out with respect to the tesseral harmonic expansions of the scene and display radiances, although the mathematics become somewhat more involved. It is useful to therefore present the set of equations associated with this alternative embodiment. It should be further understood that the following mathematical presentation encompasses not only tilted cameras but also the use of either stigmatic cameras (i.e., the standard television camera with its associated "stigmatic" optics) or astigmatic cameras (e.g., sensor or detector arrays). A description of the theory of astigmatic imaging can be found in the book, *Geometrical Optics, An Introduction to Hamilton's Method*, by J. L. Synge, Cambridge University Press, London, England in 1962, on pp. 76–84, and is incorporated by reference hereinto. A reference on visible array detectors, which may be considered to be an embodiment of astigmatic cameras, can be found in the book *Handbook of Optics, Devices, Measurements and Properties, Second Edition, Vol. I*, Michael Bass, Editor-in-Chief, published by McGraw Hill, New York, N.Y., Chapter 22, and is incorporated by reference hereinto.

Figure 14:
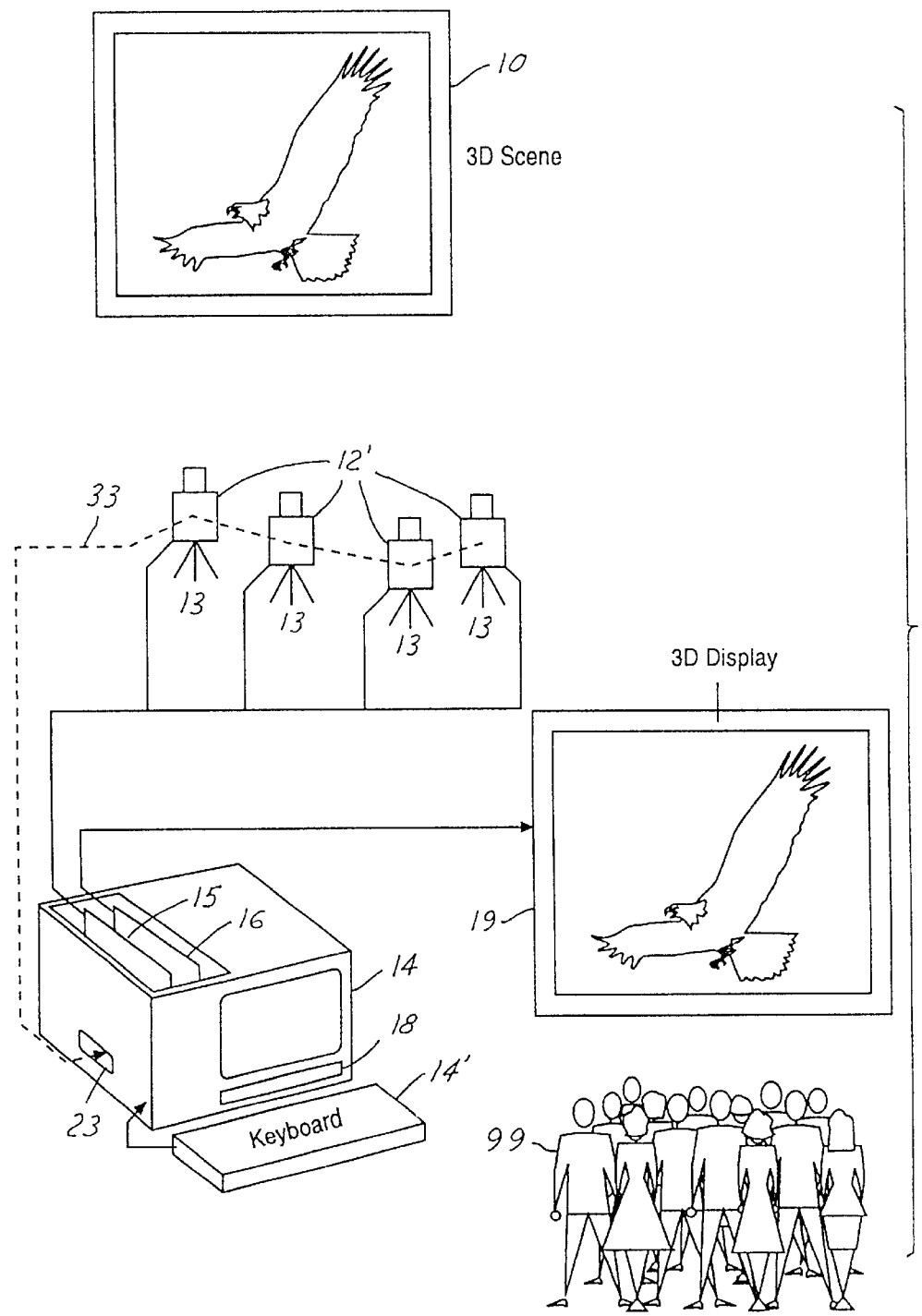
FIG. 14 is a schematic diagram showing another embodiment, similar to that shown in FIG. 1, except that the cameras are astigmatic.
Figure 15:
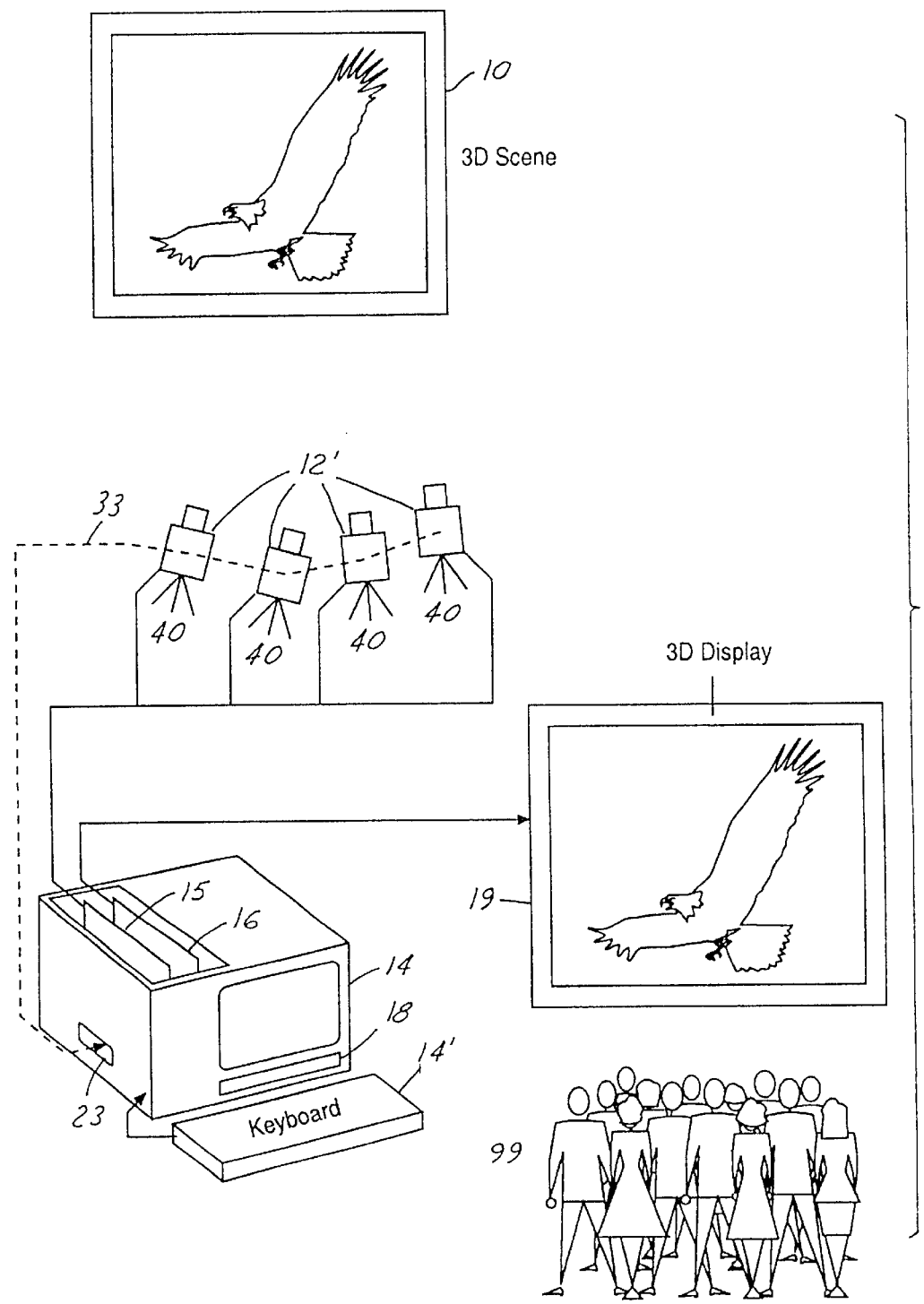
FIG. 15 is a schematic diagram showing another embodiment, similar to that shown in FIG. 1, except that some of the cameras are now tilted with respect to the three-dimensional scene and the cameras are astigmatic.

It should therefore be understood that the present invention may be embodied in a variety of ways, with the currently preferred embodiment including parallel stigmatic cameras 12, as shown in FIG. 1. An alternative embodiment utilizes tilted stigmatic cameras, as shown in FIG. 13, where each camera 12 is mounted on a gimbal 40 having two degrees of freedom. The gimbal allows for convenient positioning of its attached camera. Yet another embodiment of the invention utilizes parallel astigmatic cameras 12', as shown in FIG. 14. A further embodiment utilizes tilted astigmatic cameras, as shown in FIG. 15, where each astigmatic camera 12' is mounted on a gimbal 40.

Figure 16:
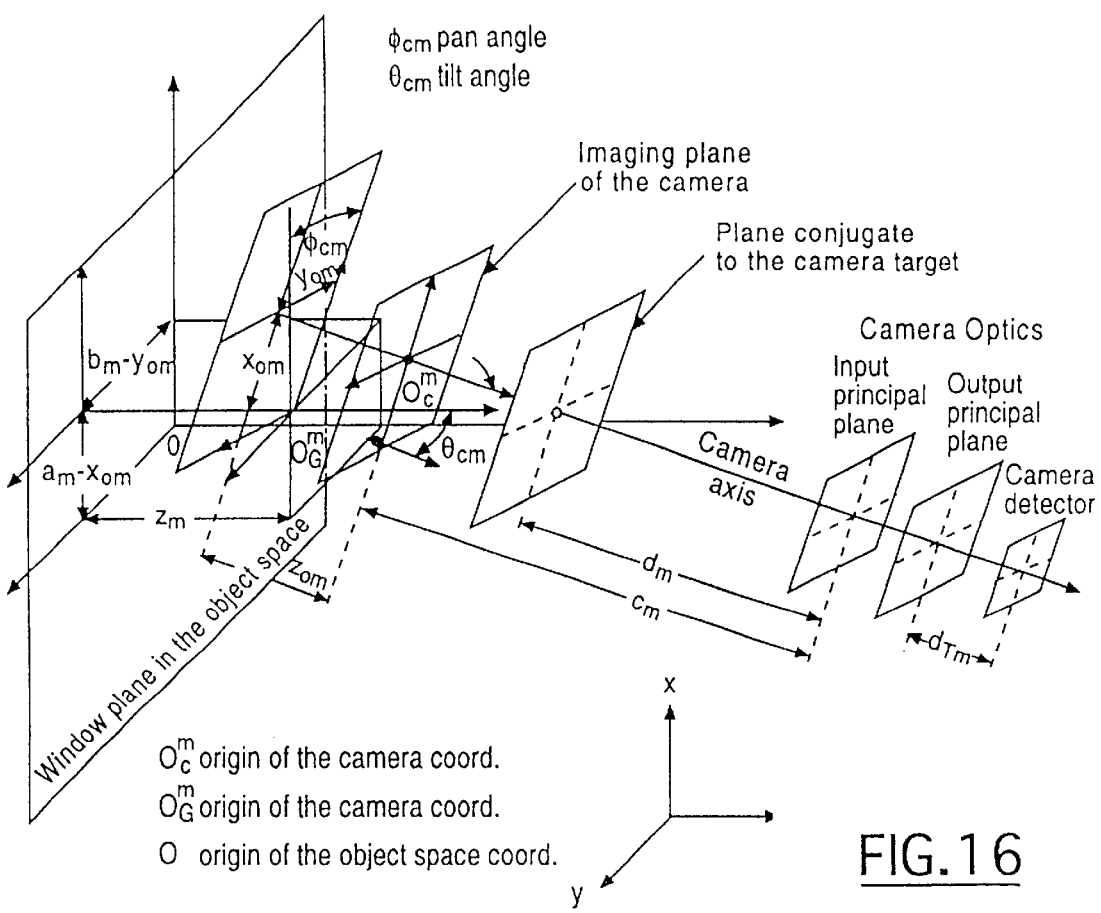
FIG. 16 is a graphical depiction of the coordinates used in the mathematical analysis, similar to FIG. 10, except it is more general and applies to all the embodiments of the present invention.

These alternative embodiments of the invention, and with further reference to FIG. 16, can be described in a comprehensive analytic fashion as follows. As noted earlier, $d_m$ is the distance of the plane conjugate to the detector of camera m from the input principal plane of the optics of camera m. The distance both of the origin of the coordinates of camera m and of the camera m imaging plane itself from the input principal plane of the optics of camera m, is $c_m$. It should be understood that $d_m$ may generally differ from $c_m$, but for a stigmatic camera as used in the presently preferred embodiment, $c_m \equiv d_m$. For an astigmatic camera, $c_m >> d_m$. Let $(x_{0m}, y_{0m}, z_{0m})$ be the offset of the origin of the camera coordinates from the gimbal or tripod center, and $(a_m-x_{0m}, b_m-y_{0m}, z_m)$ be the offset of the center of the gimbal or tripod from the origin of the coordinates of the object space coordinates, where the window is located. With additional reference to FIG. 16, The following matrices are defined:

$$A_m = \begin{bmatrix} 1 & 0 & 0 & a_m - x_{0m} \\ 0 & 1 & 0 & b_m - y_{0m} \\ 0 & 0 & 1 & z_m \\ 0 & 0 & 0 & 1 \end{bmatrix} \quad (26)$$

$$T_m = \begin{bmatrix} \cos\phi_{cm} & -\sin\phi_{cm}\cos\theta_{cm} & \sin\phi_{cm}\sin\theta_{cm} & 0 \\ \sin\phi_{cm} & \cos\phi_{cm}\cos\theta_{cm} & -\cos\phi_{cm}\sin\theta_{cm} & 0 \\ 0 & \sin\theta_{cm} & \cos\theta_{cm} & 0 \\ 0 & 0 & 0 & 1 \end{bmatrix} \quad (27)$$

$$F_m = \begin{bmatrix} 1 & 0 & 0 & x_{0m} \\ 0 & 1 & 0 & y_{0m} \\ 0 & 0 & 1 & z_{0m} + c_m - d_m \\ 0 & 0 & 0 & 1 \end{bmatrix} \quad (28)$$

where the angles $\theta_{cm}$ and $\phi_{cm}$ are the pan and tilt angles of rotation of the $m^{th}$ camera on the gimbal, respectively. These matrices, i.e., Eqs. 26–28 are used for geometrical transformations of the image coordinates, and are described in the reference *Digital Image Processing, 2nd Edition*, by Rafael C. Gonzales and Paul Wintz, published by Addison-Wesley of Reading, Mass. in 1987, pp.36–54, and which is incorporated by reference hereinto. Now by defining the auxiliary coordinate vectors $[x_{m,ij}^*, y_{m,ij}^*, z_{m,ij}^*, z_{m,ij}^*, 1]^T$ and $[X_m^*, Y_m^*, Z_m^*, 1]^T$, the following relationships hold:

$$\begin{bmatrix} x_{m,ij}^* \\ y_{m,ij}^* \\ z_{m,ij}^* \\ 1 \end{bmatrix} = A_m T_m F_m \begin{bmatrix} x_{m,i} \\ y_{m,j} \\ 0 \\ 1 \end{bmatrix} \quad (29)$$

$$\begin{bmatrix} X_m^* \\ Y_m^* \\ Z_m^* \\ 1 \end{bmatrix} = A_m T_m F_m \begin{bmatrix} X \\ Y \\ d_m \\ 1 \end{bmatrix} \quad (30)$$

Then, the expression for the total light power received by pixel (i,j) of the detector of camera m, m=1,2, . . . ,M, can be approximated by:

$$L_m(i, j) = 4d^2\mu_m^2 \int_{-P_x}^{P_x} \int_{-P_y}^{P_y} \left( \sum_{p=1}^{\infty} R_p(x_{m,ij}, y_{m,ij}) \right) K_{p,m}^*(X, Y, i, j) dX dY \quad (31)$$

where $$K_{p,m}^*(X, Y, i, j) = Y_p(\theta_{m,ij}^*, \phi_{m,ij}^*) \frac{z_{m,ij}^*(Z_{m,ij}^* - z_{m,ij}^*)}{r_{m,ij}^{3/2} r_{c,m,ij}^{1/2}} \quad (32)$$

$$r_{m,ij}^2 = (X_m^* - x_{m,ij})^2 + (Y_m^* - y_{m,ij})^2 + Z_m^{*2} \quad (33)$$

$$r_{c,m,ij}^2 = (X_m^* - x_{m,ij}^*)^2 + (Y_m^* - y_{m,ij}^*)^2 + (Z_m^* - z_{m,ij}^*)^2 \quad (34)$$

-continued $$\cos\theta_{m,ij}^* = \frac{Z_m^*}{r_{m,ij}} \quad (35)$$

$$\sin\theta_{m,ij}^* = \frac{\sqrt{(X_m^* - x_{m,ij})^2 + (Y_m^* - y_{m,ij})^2}}{r_{m,ij}} \quad (36)$$

$$\cos\phi_{m,ij}^* = \frac{(X_m^* - x_{m,ij})}{\sqrt{(X_m^* - x_{m,ij})^2 + (Y_m^* - y_{m,ij})^2}} \quad (37)$$

$$\sin\phi_{m,ij}^* = \frac{(Y_m^* - y_{m,ij})}{\sqrt{(X_m^* - x_{m,ij})^2 + (Y_m^* - y_{m,ij})^2}} \quad (38)$$

$$x_{m,ij} = \frac{Z_m^* x_{m,ij}^* - X_m^* z_{m,ij}^*}{Z_m^* - z_{m,ij}^*} \quad (39)$$

$$y_{m,ij} = \frac{Z_m^* y_{m,ij}^* - Y_m^* z_{m,ij}^*}{Z_m^* - z_{m,ij}^*} \quad (40)$$

Eqs. 26–40 are used to solve for the set of display-excitation electrical-input signals, $W_p$, in a manner similar to that used in the presently preferred embodiment described previously in Eq. 3. The solution requires the numerical evaluation of the integral, Eq. 31, and, because of the dependence of the arguments, $x_{m,ij}$ and $y_{m,ij}$ of $R_p$ on the variables of integration, X and Y, in this alternative embodiment(see Eqs. 26–30 and Eqs. 32–40), $R_p$ cannot be removed from inside the double integrals. Hence the numerical solution of Eq. 31 will involve a more complex set of equations compared with the solution to Eq. 3; however the resulting equations remain linear in terms of the solution for $R_p$, and thus the techniques already disclosed herein can be utilized. The integration in the presently preferred and alternative embodiments of the invention are numerically evaluated using a trapezoidal integration rule, according to the description provided in *Numerical Recipes in Fortran The Art of Scientific Computing 2nd edition*, by William Press et al., Cambridge University Press, Cambridge, England, 1992, Chapter 4, which is included by reference hereinto. It should be further understood that any numerical integration procedure can be utilized, as well as any quantitative means. It is further to be noted that certain nonlinear solution techniques can also be utilized for the solution of Eq. 3 and of Eq. 31, in order to deal more effectively with the effects of noise and nonlinearities and non-ideal natures of the various components used in the present invention. These nonlinear techniques can be understood to include the use of neural networks; see for example the book *Neural Networks A Comprehensive Foundation*, by Simon Haykin, published by IEEE Press, 1994, and incorporated by reference hereinto. In such a variation of the present invention, the outputs of the video cameras serve as inputs to an appropriately configured neural network, whose outputs are the set of display-excitation electrical input signals. The neural network is first configured or trained on a set of data (i.e., the "training data set") consisting of known three-dimensional still or dynamic scenes.

It will be additionally understood that the video cameras shown in FIG. 1, FIG. 13, FIG. 14, and FIG. 15 call in the preferred and alternative embodiments of the present invention be adapted for control and communication of their respective spatial positions and optical settings to the processing computer (indicated by the dashed lines 33 in the respective figures connected to the cameras and serial port 23 of computer 14), thus enabling the use of practical and modern television production techniques. It should also be understood that knowledge of the positions and optical settings of all the cameras used in all of the presently preferred embodiments must be available for solving Eq. 3 or Eq. 31 for the display-excitation electrical-input signals.

It will be seen also that the methods and apparatus disclosed herein encompasses not only monochrome display of three dimensional scenes, but also the display of full color three-dimensional images. In this case, it will be understood that the processing as described herein is applied to each separate color utilized for display. It is to be understood that the camera detector is assumed in the presently preferred embodiments of the invention to absorb light according to Lambert's cosine law. However, any other radiometric characteristic of the detector can be easily incorporated into the present invention through appropriate modifications of Eq. 4 or Eq. 32. It is further to be realized that chromatic aberrations can be addressed using techniques well known in the optical sciences, although the present invention does not make explicit use of these improvements and modifications. An additional point to be understood is that the display device and three-dimensional scene need not be of the same size, and that inclusion of an additional magnification factor, similar to $\mu_m$, can be understood to offer a complete variety in display sizes, relative to the original three-dimensional scene. Moreover, it should be understood that all the embodiments and variations of the display device, including for example micromirrors, LCDs, LED, fiber optics and other display means, can be utilized in the various embodiments as presented in FIG. 1, FIG. 13, FIG. 14 and FIG. 15, and described by Eqs. 26–40. It should also be pointed out that in some alternative embodiments it may be desirable to provide a three-dimensional view for observers with only two degrees of freedom (i.e., x-z or y-z) or only one degree of freedom (x or y or z only). In another variation of the present invention, it should also be understood that the terms used in the tesseral harmonic expansions of Eq. 3 and Eq. 31 need not necessarily be sequentially chosen. For example, the expansion in Eq. 2 can be written as $$R(x, y, \theta, \phi) = \sum_{p=1}^{Q} R_{2p+1}(x, y) Y_{2p+1}(\theta, \phi) \tag{40}$$

In this case, Q terms in total are used, except that p=3,5, 7, . . . , 2Q+1 are the only terms used in the expansion. In one alternative variation, the terms in the tesseral harmonic expansion are chosen in order to enhance the quality of the displayed three-dimensional image from a point of view which is coincident with the z-axis. Other choices for terms used in the tesseral harmonic expansion will be understood to provide three-dimensional images of higher quality depending on the relative degrees of freedom allowed for the observer positions.

Finally, it should be understood that the respective embodiments and variations of the invention can be implemented using either analog or digital processing techniques and that these techniques can be further understood to include the use of "real-time" signal processors. Thus it is appreciated from the foregoing that the present invention can be utilized for three-dimensional display of both "still" three-dimensional scenes or dynamic three-dimensional (television and video) scenes. It should lastly be recognized and appreciated that not only can tesseral harmonic functions be used, but that any orthogonal set of functions may be utilized in the expansion of Eq. 2. For example, one such set of functions can be constructed from the set of Tchebychef polynomials. An excellent reference for the theory of orthogonal functions is the book *Orthogonal Functions,* *Revised English Edition*, by Giovanni Sansone, Dover Publications, Inc., New York, N.Y., in 1991, and which is included by reference hereinto. Another excellent reference on orthogonal functions is the book *Handbook of Mathematical Functions*, M. Abramowitz and I. A. Stegun, Dover Publications, New York, 1965, ninth printing, and which is incorporated by reference hereinto.

It will be seen that the described invention meets all stated objectives as to the three-dimensional display of three-dimensional objects and scenes, with the specific advantages that it provides for true multiviewpoint and autostereoscopic capabilities. Moreover, the disclosed apparatus and method provides herein for the first time a coherent and comprehensive mathematical framework by which the three-dimensional display of three-dimensional scenes may be achieved. In summary, it should be noted that the invention as presently disclosed provides for the following advantages and improvements:

i. True multiviewpoint capabilities, thereby allowing a group of people to view the three-dimensional images from a continuum of viewpoints, and thereby allowing each individual to observe a distinct three-dimensional view;

ii. Autostereoscopic capability, without the use of viewing glasses or any type of head locator/detector means;

iii. A natural and accurate display of the three-dimensional scene, which does not cause or lead to viewer fatigue;

iv. Compatibility with standard (two-dimensional) television technology; and v. Practicality and cost-effectiveness in comparison with other systems.

What is claimed is:

1. Apparatus for providing a three-dimensional image of a three-dimensional scene, said apparatus comprising:

(a) a set of M two-dimensional views of said three-dimensional scene;

(b) encoding means for processing said set of M two-dimensional views to obtain a set of display-excitation electrical-input signals; and (c) planar display means connected for response to said set of display-excitation electrical-input signals, whereby to produce said three-dimensional image of said three-dimensional scene.

2. Apparatus according to claim 1, wherein said display means is a digital micromirror device.

3. Apparatus according to claim 1, wherein said display means is a light emitting diode array device.

4. Apparatus according to claim 1, wherein said display means is a liquid crystal display device.

5. Apparatus for providing a sequence of three-dimensional images of a sequence of three-dimensional scenes, said apparatus comprising:

(a) a sequence of sets of M two-dimensional views of said sequence of three-dimensional scenes;

(b) encoding means for processing said sequence of sets of M two-dimensional views to obtain a sequence of sets of display-excitation electrical-input signals; and (c) planar display means connected for response to said sequence of sets of display-excitation electrical-input signals, whereby to produce said sequence of three-dimensional images of said sequence of three-dimensional scenes.

6. Apparatus according to claim 5, wherein said display means is a digital micromirror device.

7. Apparatus according to claim 5, wherein said display means is a light emitting diode array device.

8. Apparatus according to claim 5, wherein said display means is a liquid crystal display device.

9. Apparatus for providing a three-dimensional image of a three-dimensional scene, said apparatus comprising:
   (a) a set of M two-dimensional views of said three-dimensional scene;
   (b) encoding means for processing said set of M two-dimensional views to obtain a set of display-excitation electrical-input signals; and,
   (c) planar display means connected for response to said set of display-excitation electrical-input signals, said planar display means including a set of light-radiating elements and adapted for controlling the radiance pattern from each of said light-radiating elements in said set of light-radiating elements to thereby produce said three-dimensional image of said three-dimensional scene.

10. Apparatus according to claim 9, wherein said display means is a digital micromirror devices.

11. Apparatus according to claim 9, wherein said display means is a light emitting diode array device.

12. Apparatus according to claim 9, wherein said display means is a liquid crystal display device.

13. Apparatus for providing a sequence of three-dimensional images of a sequence of three-dimensional scenes, said apparatus comprising:
   (a) a sequence of sets of M two-dimensional views of said sequence of three-dimensional scenes;
   (b) encoding means for processing said sequence of sets of M two-dimensional views to obtain a sequence of sets of display-excitation electrical-input signals;
   (c) planar display means connected for response to said sequence of sets of display-excitation electrical-input signals, said planar display means including a set of light-radiating elements and adapted for controlling the radiance pattern from each of said light-radiating elements in said set of light-radiating elements to thereby produce said sequence of three-dimensional images of said sequence of three-dimensional scenes.

14. Apparatus according to claim 13, wherein said display means is a digital micromirror device.

15. Apparatus according to claim 13, wherein said display means is a light emitting diode array device.

16. Apparatus according to claim 13, wherein said display means is a liquid crystal display device.

17. The method for producing a three-dimensional image of a three-dimensional scene, using a set of M two-dimensional views of said three-dimensional scene, and a planar display, which method comprises the steps of:
   (a) using said set of M two-dimensional views to produce a set of display-excitation electrical-input signals; and
   (b) driving said planar display with said set of display-excitation electrical-input signals to produce said three-dimensional image of said three-dimensional scene.

18. The method for producing a sequence of three-dimensional images of a sequence of three-dimensional scenes, using a sequence of sets of M two-dimensional views of said sequence of three-dimensional scenes, and a planar display, which method comprises the steps of:
   (a) using said sequence of sets of M two-dimensional views to produce a sequence of sets of display-excitation electrical-input signals; and
   (b) driving said planar display with said set of display-excitation electrical-input signals to produce said sequence of three-dimensional images of said sequence of three-dimensional scenes.

19. The method for producing a three-dimensional image of a three-dimensional scene, using a set of M two-dimensional views of said three-dimensional scene, and a planar display comprised of a set of light-radiating elements, in which a radiance pattern of each of said light-radiating elements of said set of light-radiating elements is controllable, which method comprises the steps of:
   (a) using said set of M two-dimensional views to produce a set of display-excitation electrical-input signals;
   (b) driving said planar display with said set of display-excitation electrical-input signals; and
   (c) controlling the radiance pattern of light radiated from each of said light-radiating elements of said set of light-radiating elements in said planar display to produce said three-dimensional image of said three-dimensional scene.

20. The method for producing a sequence of three-dimensional images of a sequence of three-dimensional scenes, using a sequence of sets of M two-dimensional views of said sequence of three-dimensional scenes, and a planar display comprised of a set of light-radiating elements, in which a radiance pattern of each of said light-radiating elements of said set of light-radiating elements is controllable, which method comprises the steps of:
   (a) using said sequence of sets of M two-dimensional views to produce a sequence of sets of display-excitation electrical-input signals;
   (b) driving said planar display with said sequence of sets of display-excitation electrical-input signals; and
   (c) controlling the radiance pattern of light radiated from each of said light-radiating elements of said set of light-radiating elements in said planar display to produce said sequence of three-dimensional images of said sequence of three-dimensional scenes.

21. Apparatus for providing a three-dimensional image of a three-dimensional scene, said apparatus comprising:
   (a) a set of M two-dimensional views of said three-dimensional scene;
   (b) encoding means for processing said set of M two-dimensional views to obtain a set of display-excitation electrical-input signals, said encoding means including means for orthogonal expansion of said set of M two-dimensional views; and,
   (c) display means connected for response to said set of display-excitation electrical-input signals, whereby to produce said three-dimensional image of said three-dimensional scene.

22. The apparatus of claim 21, wherein said means for orthogonal expansion of said set of M two-dimensional views includes means for tesseral harmonic expansion of said set of M two-dimensional views.

23. The apparatus of claim 21, wherein said means for orthogonal expansion of said set of M two-dimensional views includes means for Tchebychef polynomial expansion of said set of M two-dimensional views.

24. The method for producing a three-dimensional image of a three-dimensional scene, comprising the steps of:
   (a) deriving, with at least one orthogonal expansion, a set of display-excitation electrical-input signals; and,
   (b) driving a display with said set of display-excitation electrical-input signals to produce said three-dimensional image of said three-dimensional scene.

25. The method of claim 24, wherein said orthogonal expansion is a tesseral harmonic expansion.

26. The method of claim 24, wherein said orthogonal expansion is a Tchebychef polynomial expansion.

27. Apparatus for providing a three-dimensional image of a three-dimensional scene, said apparatus comprising:
   (a) a set of M two-dimensional views of said three-dimensional scene;
   (b) encoding means for processing said set of M two-dimensional views to obtain a set of display-excitation electrical-input signals, said encoding means including means for orthogonal expansion of said set of M two-dimensional views; and,
   (c) planar display means connected for response to said set of display-excitation electrical-input signals, whereby to produce said three-dimensional image of said three-dimensional scene.

28. The apparatus of claim 27, wherein said means for orthogonal expansion of said set of M two-dimensional views includes means for tesseral harmonic expansion of said set of M two-dimensional views.

29. The apparatus of claim 27, wherein said means for orthogonal expansion of said set of M two-dimensional views includes means for Tchebychef polynomial expansion of said set of M two-dimensional views.

30. The method for producing a three-dimensional image of a three-dimensional scene, comprising the steps of:
   (a) deriving, with at least one orthogonal expansion, a set of display-excitation electrical-input signals; and,
   (b) driving a planar display with said set of display-excitation electrical-input signals to produce said three-dimensional image of said three-dimensional scene.

31. The method of claim 30, wherein said orthogonal expansion is a tesseral harmonic expansion.

32. The method of claim 30, wherein said orthogonal expansion is a Tchebychef polynomial expansion.

* * * * *